(12) United States Patent
Wexler et al.

(10) Patent No.: US 10,367,985 B2
(45) Date of Patent: Jul. 30, 2019

(54) WEARABLE APPARATUS AND METHOD FOR PROCESSING IMAGES INCLUDING PRODUCT DESCRIPTORS

(71) Applicant: ORCAM TECHNOLOGIES LTD., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

( * ) Notice: Subject to any disclaimer, the term of this patent is extended or adjusted under 35 U.S.C. 154(b) by 153 days.

(21) Appl. No.: 14/807,580

(22) Filed: Jul. 23, 2015

(65) Prior Publication Data

US 2016/0026868 A1  Jan. 28, 2016

Related U.S. Application Data

(60) Provisional application No. 62/027,936, filed on Jul. 23, 2014, provisional application No. 62/027,957, filed on Jul. 23, 2014.

(51) Int. Cl.
*G06K 9/00* (2006.01)
*H04N 5/225* (2006.01)
(Continued)

(52) U.S. Cl.
CPC ......... *H04N 5/2259* (2013.01); *G01S 3/7864* (2013.01); *G02B 27/0093* (2013.01);
(Continued)

(58) Field of Classification Search
CPC ......... G02B 27/0093; G06T 7/74; G06T 7/97; G06F 1/188; G06F 1/1686; G06F 3/0304;
(Continued)

(56) References Cited

U.S. PATENT DOCUMENTS

2005/0234774 A1* 10/2005 Dupree ............... G06Q 30/02
                                                    705/14.57
2010/0226535 A1*  9/2010 Kimchi .............. G06F 3/013
                                                    382/103
(Continued)

OTHER PUBLICATIONS

Decoding Mtn Dew, The Open Scroll Blog, http://theopenscroll.blogspot.com/2013/08/decoding-mtn-dew.html (Aug. 24, 2013).*
(Continued)

*Primary Examiner* — Andrew M Moyer
(74) *Attorney, Agent, or Firm* — Finnegan, Henderson, Farabow, Garrett & Dunner, LLP

(57) ABSTRACT

A wearable apparatus and method are provided for processing images including product descriptors. In one implementation, a wearable apparatus for processing images including a product descriptor is provided. The wearable apparatus includes a wearable image sensor configured to capture a plurality of images from an environment of a user of the wearable apparatus. The wearable apparatus also includes at least one processing device programmed to analyze the plurality of images to identify one or more of the plurality of images that include an occurrence of the product descriptor. Based on analysis of the one or more identified images, the at least one processing device is also programmed to determine information related to the occurrence of the product descriptor. The at least one processing device is further configured to cause the information and an identifier of the product descriptor to be stored in a memory.

41 Claims, 20 Drawing Sheets

(51) Int. Cl.
| | |
|---|---|
| G06F 1/18 | (2006.01) |
| G06F 16/532 | (2019.01) |
| G02B 27/00 | (2006.01) |
| G02B 27/01 | (2006.01) |
| G06F 3/01 | (2006.01) |
| G06Q 30/02 | (2012.01) |
| H04N 5/232 | (2006.01) |
| H04N 7/18 | (2006.01) |
| G06F 1/16 | (2006.01) |
| G06F 3/00 | (2006.01) |
| G06F 3/038 | (2013.01) |
| H04N 5/235 | (2006.01) |
| G06T 7/20 | (2017.01) |
| H04N 5/44 | (2011.01) |
| G01S 3/786 | (2006.01) |
| H04N 1/21 | (2006.01) |
| G06K 9/62 | (2006.01) |
| G06F 3/03 | (2006.01) |
| G06T 7/00 | (2017.01) |
| G06T 7/73 | (2017.01) |
| G06F 16/53 | (2019.01) |
| G06F 16/51 | (2019.01) |

(52) U.S. Cl.
CPC .......... *G02B 27/017* (2013.01); *G06F 1/163* (2013.01); *G06F 1/1686* (2013.01); *G06F 1/18* (2013.01); *G06F 1/188* (2013.01); *G06F 3/005* (2013.01); *G06F 3/011* (2013.01); *G06F 3/012* (2013.01); *G06F 3/017* (2013.01); *G06F 3/0304* (2013.01); *G06F 3/038* (2013.01); *G06F 16/51* (2019.01); *G06F 16/53* (2019.01); *G06F 16/532* (2019.01); *G06K 9/00201* (2013.01); *G06K 9/00208* (2013.01); *G06K 9/00221* (2013.01); *G06K 9/00288* (2013.01); *G06K 9/00335* (2013.01); *G06K 9/00624* (2013.01); *G06K 9/00671* (2013.01); *G06K 9/00677* (2013.01); *G06K 9/00718* (2013.01); *G06K 9/6262* (2013.01); *G06Q 30/0246* (2013.01); *G06Q 30/0257* (2013.01); *G06Q 30/0267* (2013.01); *G06Q 30/0269* (2013.01); *G06T 7/20* (2013.01); *G06T 7/74* (2017.01); *G06T 7/97* (2017.01); *H04N 1/2112* (2013.01); *H04N 5/2251* (2013.01); *H04N 5/2252* (2013.01); *H04N 5/2254* (2013.01); *H04N 5/2257* (2013.01); *H04N 5/2258* (2013.01); *H04N 5/2353* (2013.01); *H04N 5/23206* (2013.01); *H04N 5/23216* (2013.01); *H04N 5/23219* (2013.01); *H04N 5/23229* (2013.01); *H04N 5/23245* (2013.01); *H04N 5/23258* (2013.01); *H04N 5/44* (2013.01); *H04N 7/183* (2013.01); *H04N 7/185* (2013.01); *G02B 2027/014* (2013.01); *G02B 2027/0138* (2013.01); *G02B 2027/0178* (2013.01); *G02B 2027/0187* (2013.01); *G06F 2203/011* (2013.01); *G06K 2209/21* (2013.01); *G06K 2209/25* (2013.01); *G06T 2207/10004* (2013.01); *G06T 2207/10016* (2013.01); *G06T 2207/30232* (2013.01)

(58) Field of Classification Search
CPC .... G06F 3/012; H04N 5/2254; H04N 5/2259; H04N 5/2257; H04N 5/23206; H04N 7/185; G06Q 30/0267; G06K 9/00671
USPC ......................................................... 382/103
See application file for complete search history.

(56) References Cited

U.S. PATENT DOCUMENTS

| | | | | |
|---|---|---|---|---|
| 2010/0328316 | A1* | 12/2010 | Stroila | G06K 9/00818 345/441 |
| 2014/0348384 | A1* | 11/2014 | Kolehmainen | G06Q 10/087 382/103 |
| 2015/0049902 | A1* | 2/2015 | Moraleda | G06K 9/00624 382/103 |
| 2015/0170249 | A1* | 6/2015 | Cockcroft | G06Q 30/0627 705/26.63 |
| 2015/0379616 | A1* | 12/2015 | Cleveland | G06Q 30/0633 705/26.8 |
| 2016/0026853 | A1* | 1/2016 | Wexler | H04N 5/2257 382/103 |

OTHER PUBLICATIONS

Wikipedia, Google Glass, https://web.archive.org/web/20130704143620/ https://en.wikipedia.org/wiki/Google_Glass (Jul. 4, 2013) (Year: 2013).*

Wikipedia, GoPro, https://web.archive.org/web/20130611082527/ https://en.wikipedia.org/wiki/GoPro (Jun. 11, 2013) (Year: 2013).*

Communication relating to the results of the partial international search included in an Invitation to Pay Additional Fees dated Feb. 4, 2016, in international application No. PCT/IB2015/001809, filed Jul. 23, 2015 (8 pages).

International Search Report and Written Opinion dated Apr. 11, 2016 in International patent application No. PCT/IB2015/001809 (19 pages).

Non-final Office Action dated Jan. 27, 2017, received in U.S. Appl. No. 14/807,661 (21 pages).

* cited by examiner

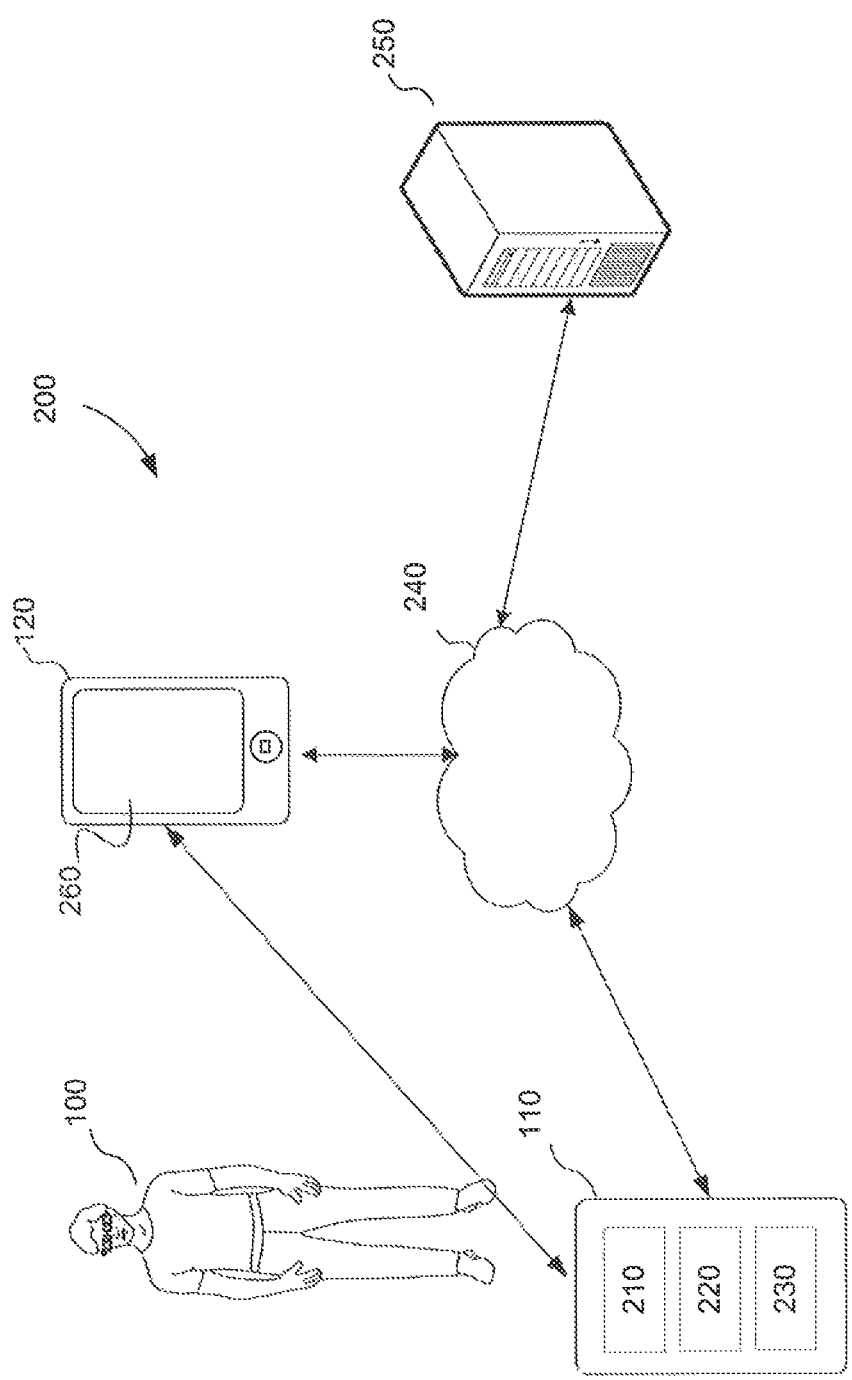

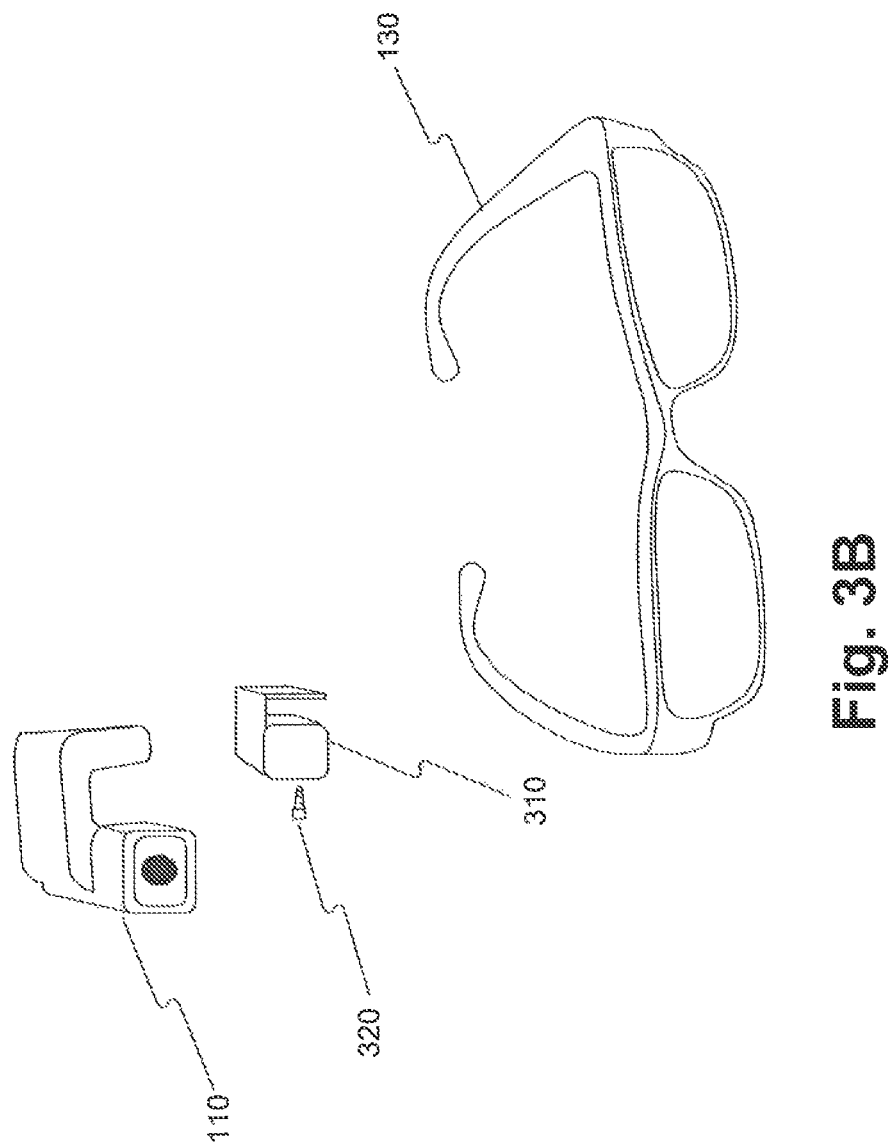

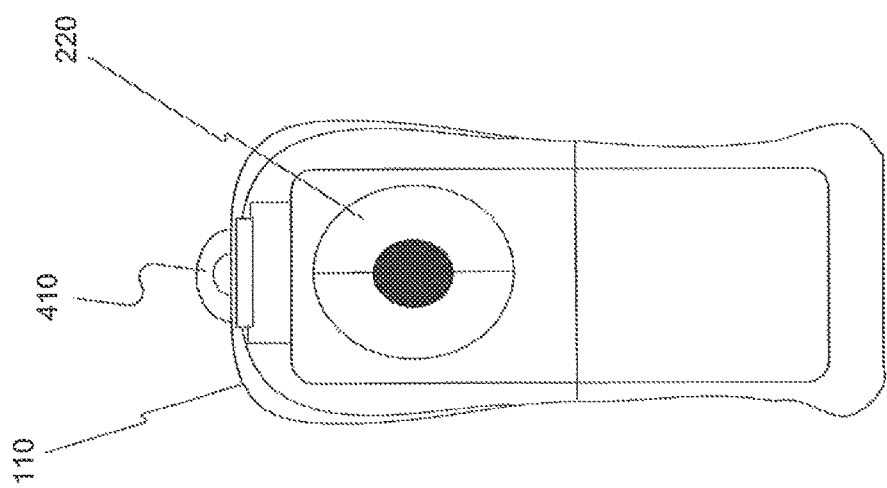

| Identifier | Commercial Descriptor | Location | Context | Date & Time |
|---|---|---|---|---|
| 1001 | Pizza advertisement | 15 K Street, Washington, DC | child looking at pizza advertisement posted in the window of food store | 6/7/2015 3:00 p.m. |
| 1002 | Logo of "W" bottled water | 15 K Street, Washington, DC | Young woman holding bottled water (brand "W") outside subway station | 6/7/2015 3:00 p.m. |
| . . . | . . . | . . . | . . . | . . . |
| 1050 | E Energy Drink | GPS 38.9047° N, 77.0164° W | E Energy Drink placed on table in soccer field | 6/15/2015 1:00 p.m. |

Fig. 11

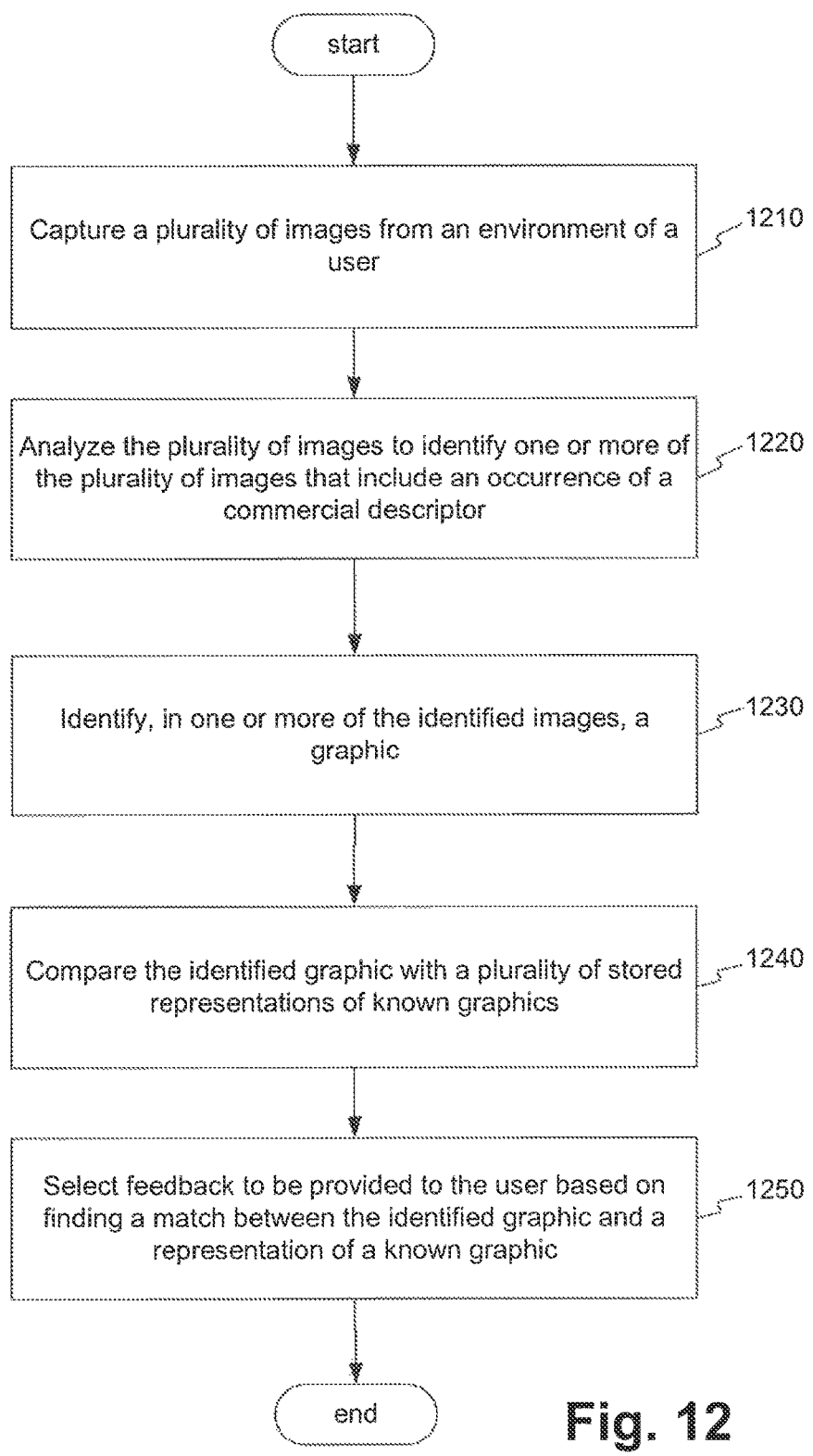

WEARABLE APPARATUS AND METHOD FOR PROCESSING IMAGES INCLUDING PRODUCT DESCRIPTORS

CROSS REFERENCES TO RELATED APPLICATIONS

This application claims the benefit of priority of U.S. Provisional Patent Application No. 62/027,936, filed on Jul. 23, 2014, and U.S. Provisional Patent Application No. 62/027,957, filed on Jul. 23, 2014, all of which are incorporated herein by reference in their entirety.

TECHNICAL FIELD

This disclosure generally relates to devices and methods for capturing and processing images from an environment of a user. More particularly, this disclosure relates to devices and methods for processing images including product descriptors.

BACKGROUND INFORMATION

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment. Therefore, there is a need for apparatuses and methods for automatically capturing and processing images in a manner that provides useful information to users of the apparatuses.

SUMMARY

Embodiments consistent with the present disclosure provide an apparatus and methods for automatically capturing and processing images from an environment of a user.

In accordance with a disclosed embodiment, a wearable apparatus for processing images including a product descriptor is provided. The wearable apparatus includes a wearable image sensor configured to capture a plurality of images from an environment of a user of the wearable apparatus. The wearable apparatus also includes at least one processing device programmed to analyze the plurality of images to identify one or more of the plurality of images that include an occurrence of the product descriptor. Based on analysis of the one or more identified images, the at least one processing device is also programmed to determine information related to the occurrence of the product descriptor. The at least one processing device is further configured to cause the information and an identifier of the product descriptor to be stored in a memory.

In accordance with another disclosed embodiment, a wearable apparatus for processing images including a product descriptor is provided. The wearable apparatus includes a wearable image sensor configured to capture a plurality of images from an environment of a user of the wearable apparatus. The wearable apparatus also includes at least one processing device programmed to analyze the plurality of images to identify one or more of the plurality of images that include an occurrence of the product descriptor. The at least one processing device is also programmed to identify, in one or more of the identified images, a graphic included in the product descriptor, and access a database of stored graphics. The at least one processing device is further programmed to compare the identified graphic to the stored graphics, and trigger execution of an action based on whether a match is found between the identified graphic and a stored graphic in the database.

In accordance with another disclosed embodiment, a method for processing images including a product descriptor is provided. The method includes capturing, via a wearable image sensor, a plurality of images from an environment of a user of a wearable device including the wearable image sensor. The method also includes analyzing the plurality of images to identify one or more of the plurality of images that include an occurrence of the product descriptor. The method also includes, based on the one or more identified images, determining information related to the occurrence of the product descriptor. The method further includes causing the information and an identifier of the product descriptor to be stored in a memory.

In accordance with yet another disclosed embodiment, a method for processing images including a product descriptor is provided. The method includes capturing, via a wearable image sensor, a plurality of images from an environment of a user of a wearable device including the wearable image sensor. The method also includes analyzing the plurality of images to identify one or more of the plurality of images that include an occurrence of the product descriptor. The method also includes identifying, in one or more of the identified images, a graphic included in the product descriptor. The method further includes accessing a database of stored graphics, comparing the identified graphic to the stored graphics, and triggering execution of an action based on whether a match is found between the identified graphic and a stored graphic in the database.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2 is a schematic illustration of an example system consistent with the disclosed embodiments.

FIG. 3B is an exploded view of the example of the wearable apparatus shown in FIG. 3A.

FIG. 4A is a schematic illustration of an example of the wearable apparatus shown in FIG. 1B from a first viewpoint.

FIG. 11 shows an example database table for storing the information and the identifier related to the occurrence of the product descriptor.

FIG. 12 is a flowchart illustrating an example method for processing images including a product descriptor.

DETAILED DESCRIPTION

Figure 1A:
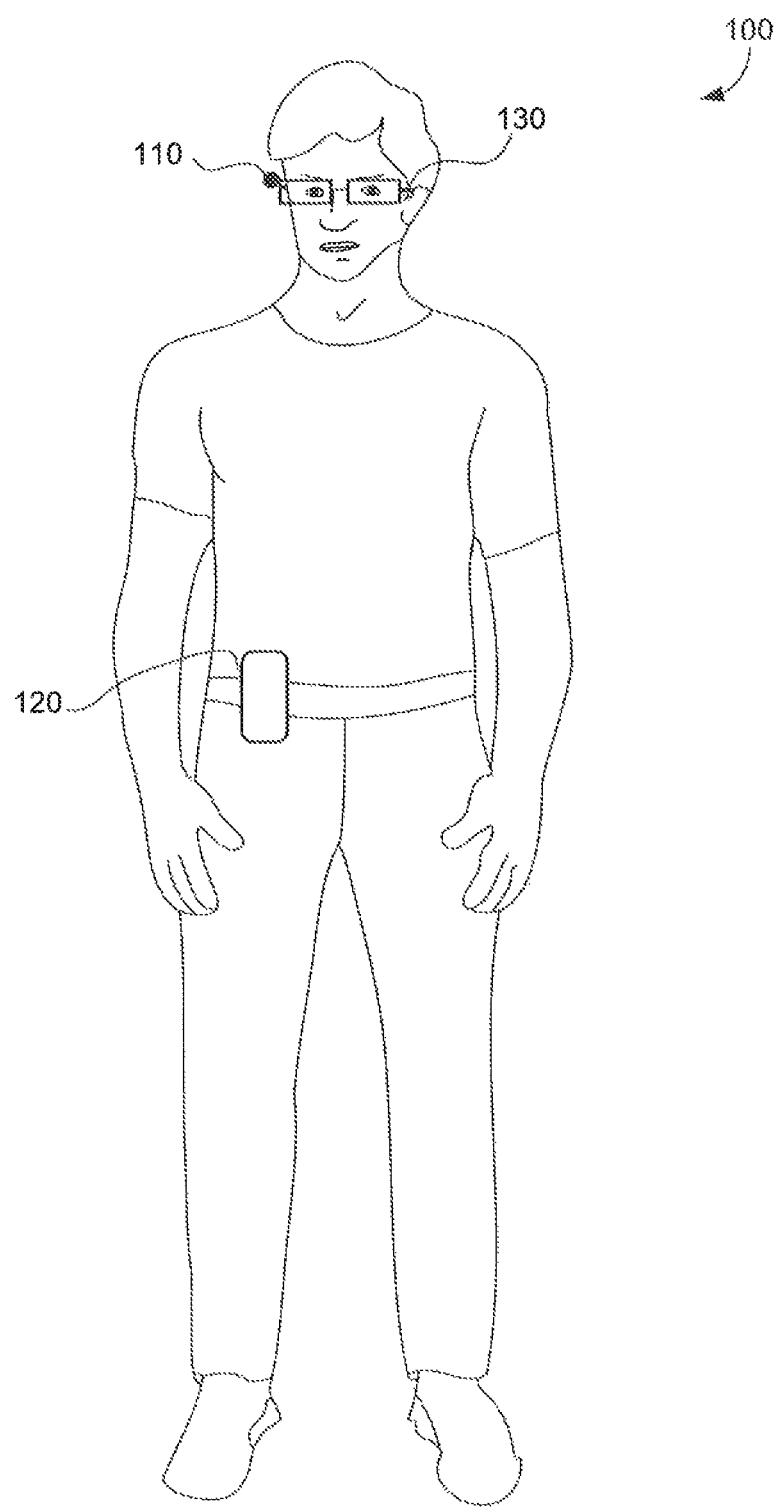
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or more lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
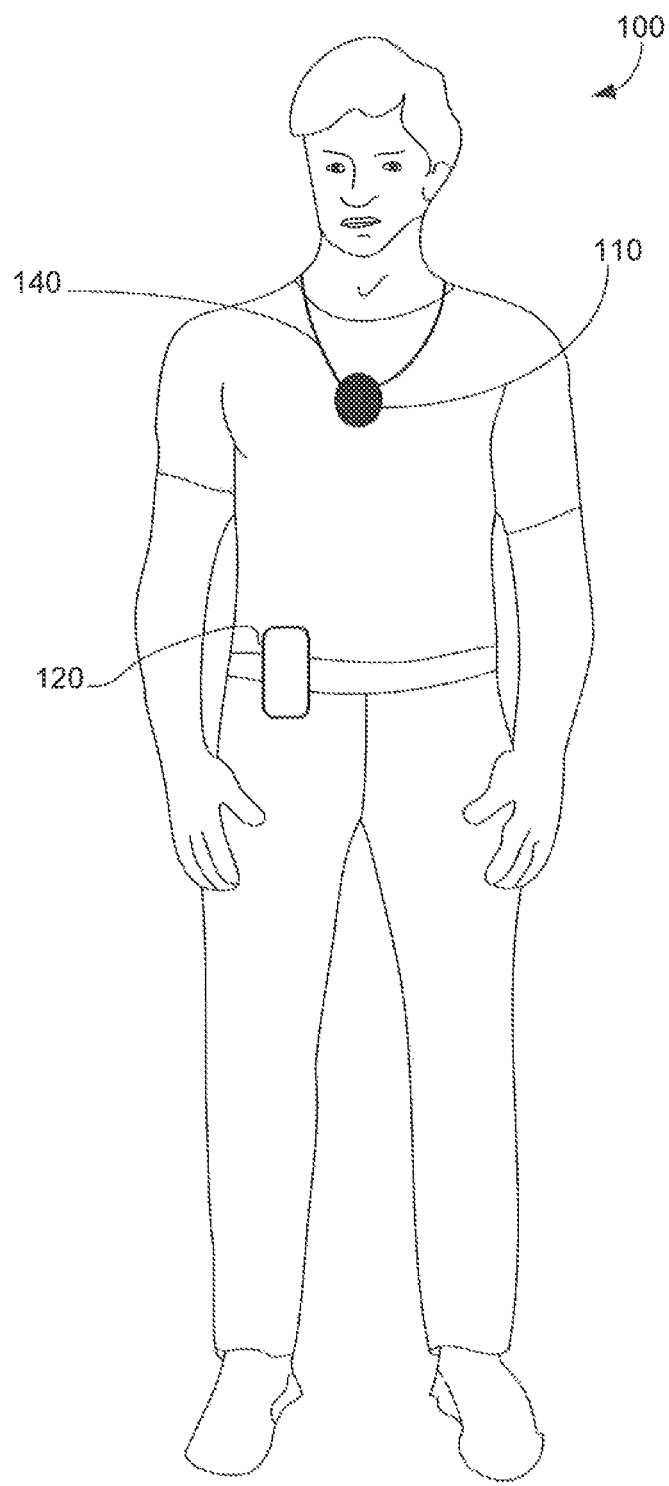
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
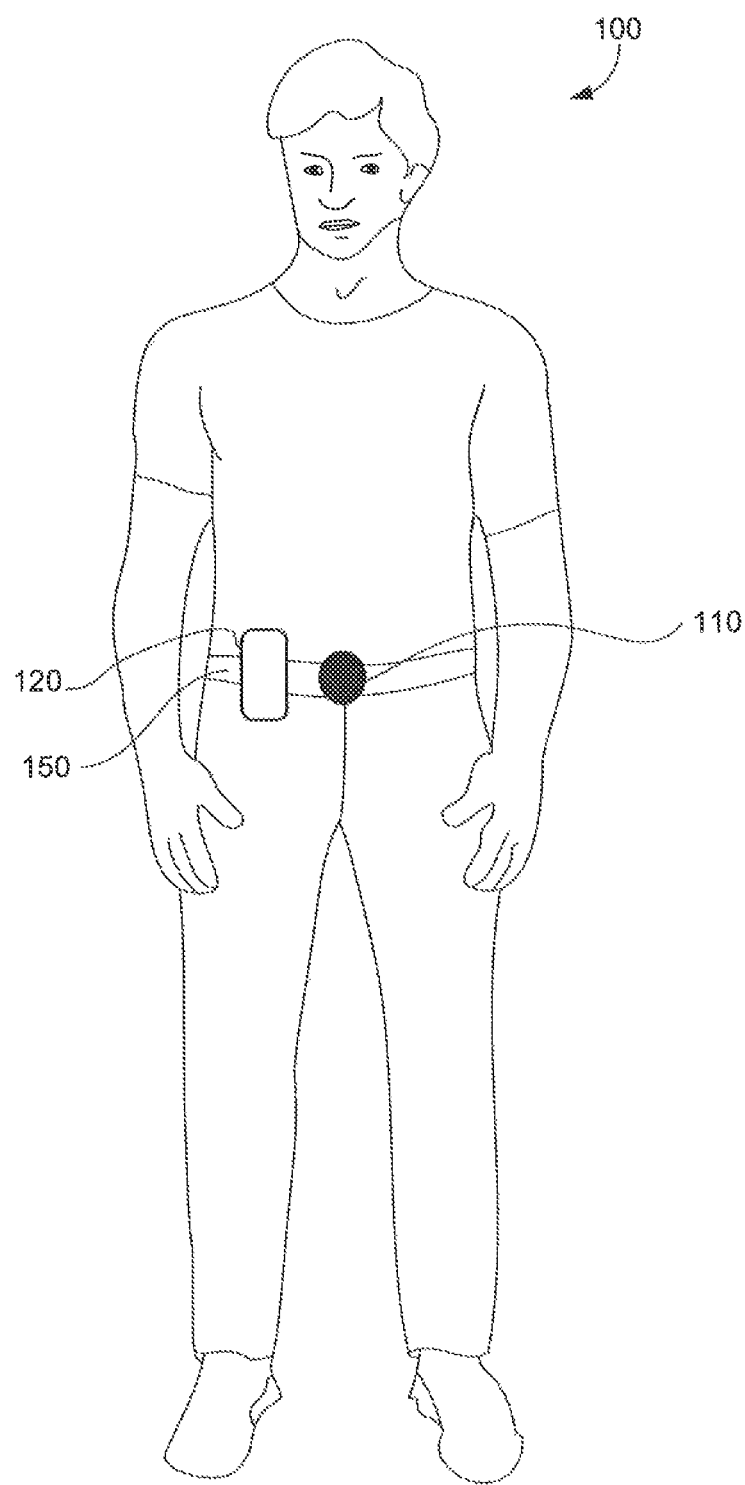
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
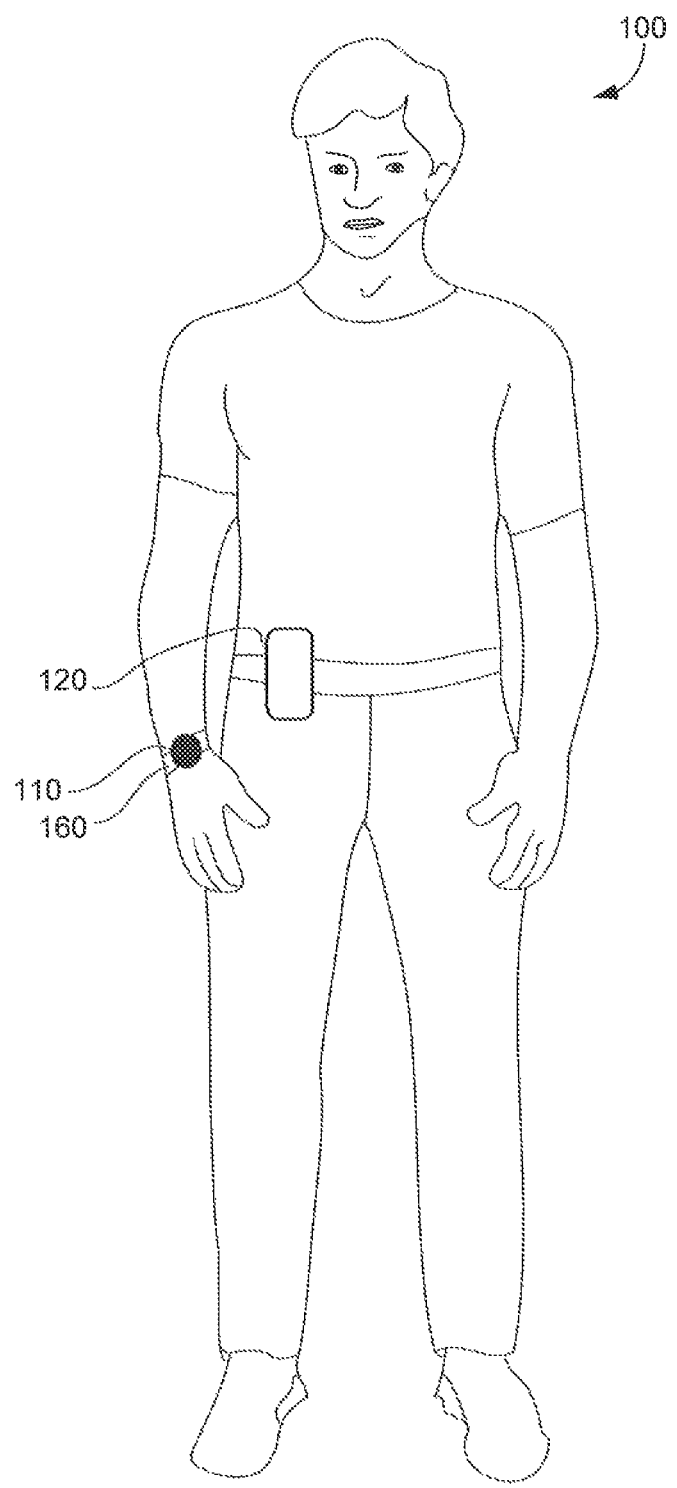
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-field capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
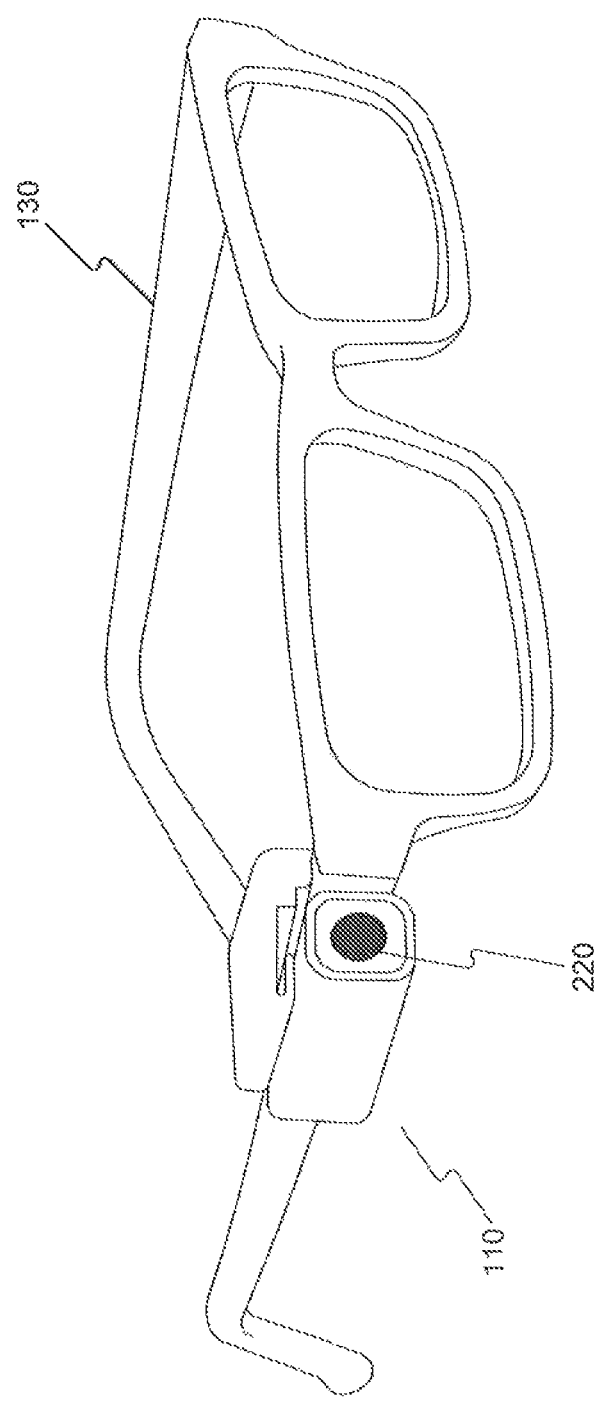
FIG. 3A is a schematic illustration of an example of the wearable apparatus shown in FIG. 1A.

An example of wearable apparatus 110 incorporated with glasses 130 according to some embodiments (as discussed in connection with FIG. 1) is shown in greater detail in FIG. 3A. In some embodiments, apparatus 110 may be associated with a structure (not shown in FIG. 3) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and me al (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a mate latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

Figure 4B:
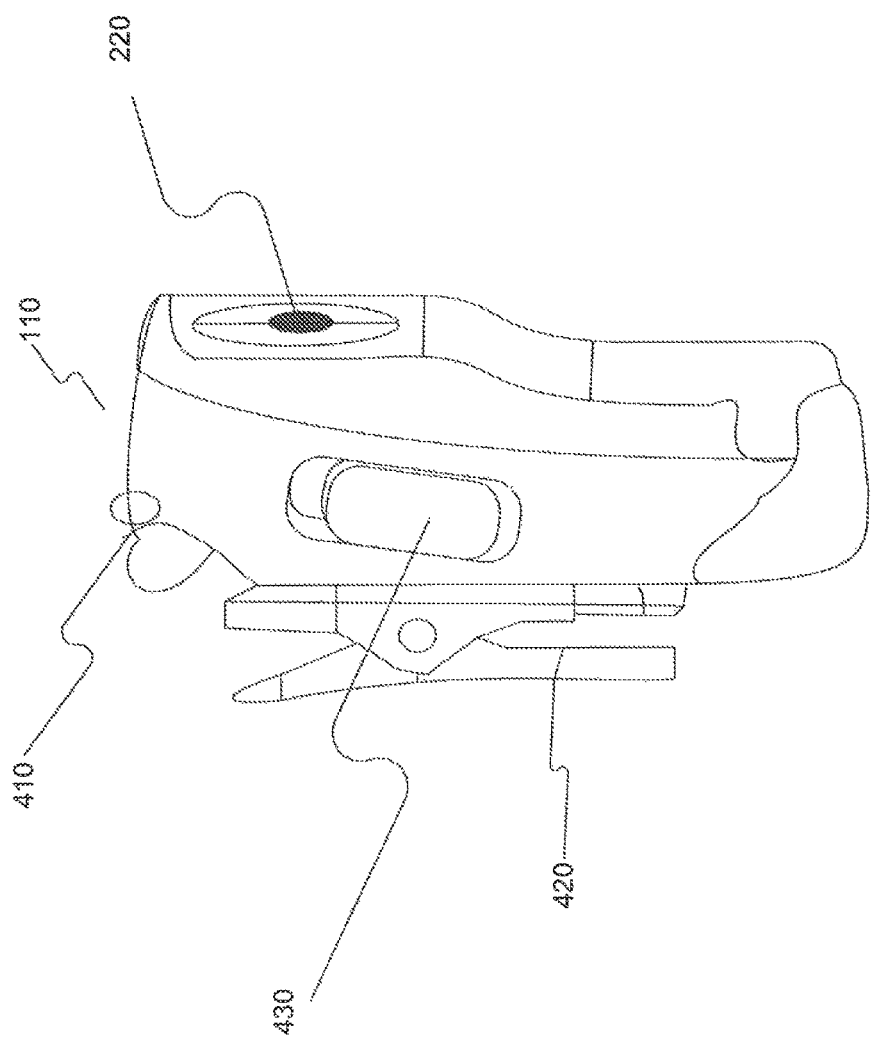
FIG. 4B is a schematic illustration of the example of the wearable apparatus shown in FIG. 1B from a second viewpoint.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 33, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
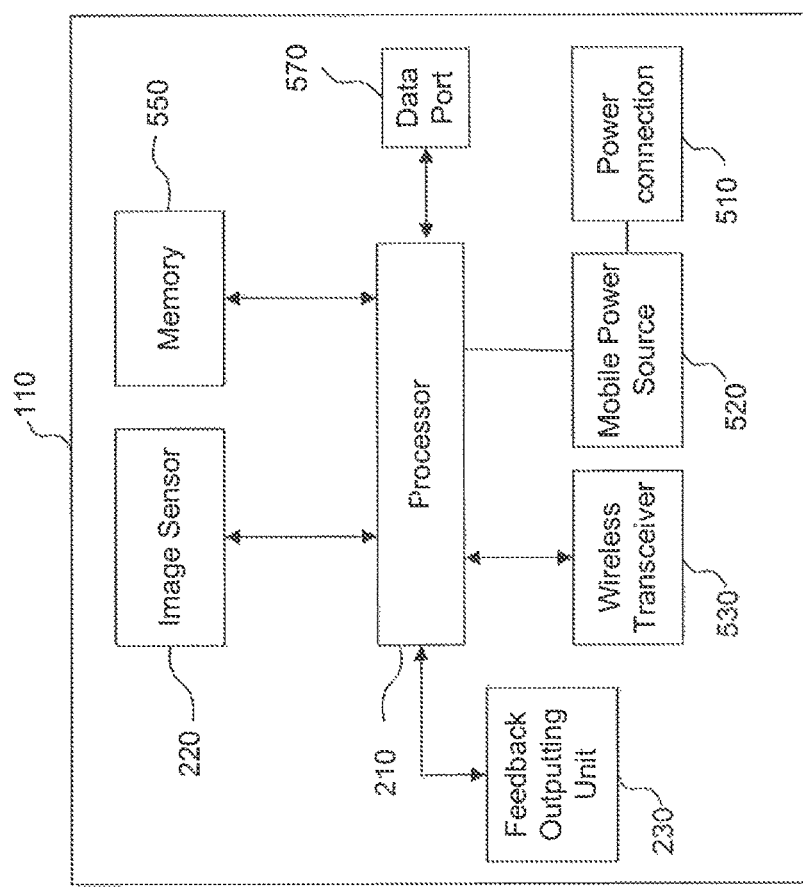
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 510 may power one or more wireless transceivers (e.g., wireless transceiver 530 in FIG. 5). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250, in other embodiments, wireless transceiver 530 may transmit data and instructions to an external feedback outputting unit 230.

Figure 5B:
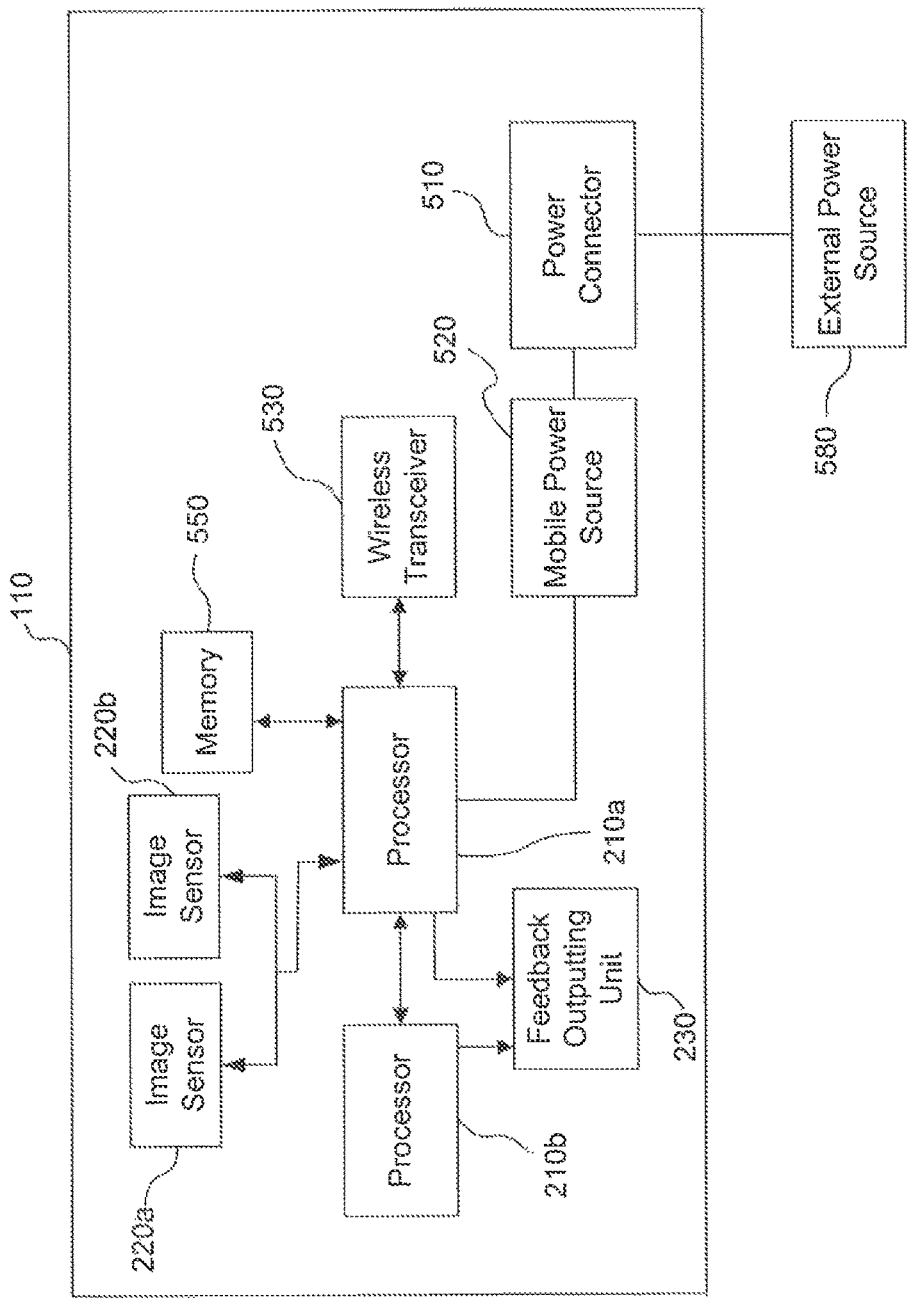
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220*a*, a second image sensor 220*0*, a memory 550, a first processor 210*a*, a second processor 210*b*, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210*a* may determine, based on available storage space in memory 550, to capture subsequent images in a certain resolution.

Apparatus 110 may operate in a first processing-mode and in a second processing mode, such that the first processing-mode may consume less power than the second processing mode. For example, in the first processing-mode, apparatus 110 may capture images and process the captured images to make real-time decisions based on an identified hand-related trigger, for example. In the second processing-mode, apparatus 110 may extract information from stored images in memory 550 and delete images from memory 550. In some embodiments, mobile power source 520 may provide more than fifteen hours of processing in the first processing mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210*a* in the first processing-mode when powered by mobile power source 520, and second processor 210*b* in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
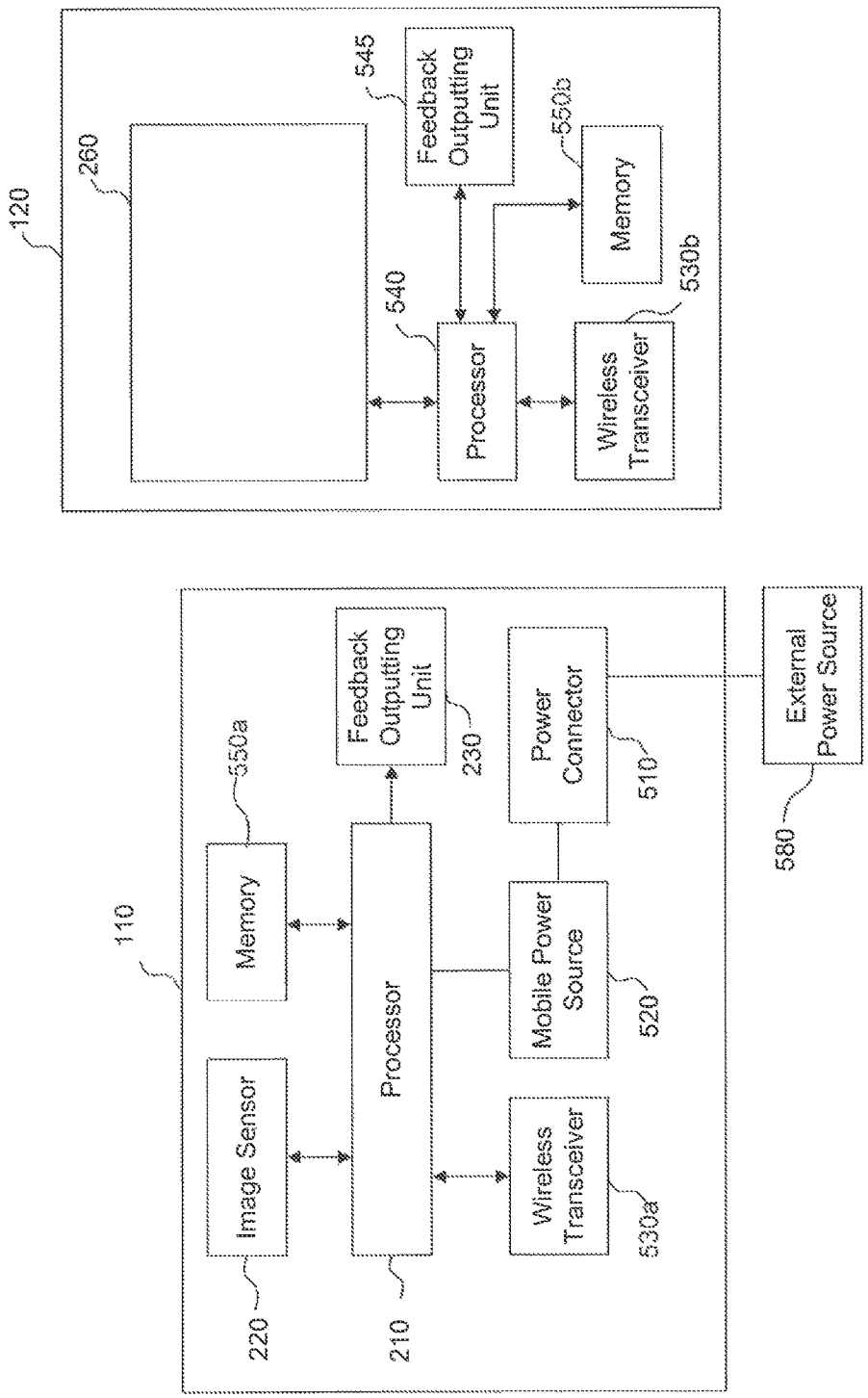
FIG. 5C is a block diagram illustrating an example of the components of a wearable apparatus according to a third embodiment.

FIG. 5C is a block diagram illustrating the components of apparatus 110 according to another example embodiment including computing device 120. In this embodiment, apparatus 110 includes an image sensor 220, a memory 550*a*, a first processor 210, a feedback-outputting unit 230, a wireless transceiver 530*a*, a mobile power source 520, and a power connector 510. As further shown in FIG. 5C, computing device 120 includes a processor 540, a feedback-outputting unit 545, a memory 550*b*, a wireless transceiver 530*b*, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550*a* for storage in memory 550*b*. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. Therefore, the foregoing configurations are examples and, regardless of the configurations discussed above, apparatus 110 can capture, store, and process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

Wearable apparatus 110 may be configured to capture images including product descriptors from an environment of user 100 through a wearable image sensor, such as image sensor 220, 220*a*, and/or 220*b*. A product descriptor may include at least one of an advertisement, a logo, a product sign, a trademark of a product, an image of a product, a brand name, an image of a store, etc. At least one processing device, such as processor 210 or processor 540 may be programmed to perform various analyses on the captured images to determine information related to the product descriptors. For example, the at least one processing device may extract a name of a product from a product descriptor included in the captured image. The at least one processing device may be further programmed to determine or extract information related to a location of the product descriptor, such as at a subway station, on a street, outside of a restaurant, etc. In some embodiments, the location may include Global Positioning System (GPS) location data, in some embodiments, one or more processors included in server 250 may also be programmed to perform one or more methods or processes disclosed herein.

The at least one processing device may further determine or extract a context associated with the occurrence of the product descriptor from the captured images. The product descriptor may be associated with a product or service (collectively referred to as a "product"). The context may include any information about the environment or other objects included in the captured images in which the product descriptor occurs. For example, the context may include location and time information related to the occurrence of the product descriptor. The context may include information about a surrounding environment in which the product descriptor occurs, such as a street, a restaurant, a store, a building, sports field, etc. For example, a captured image may show a pizza may appear on a table in a restaurant. As another example, an energy drink may appear on a soccer field in a captured image.

The context may include one or more persons who appear in the same image as the product descriptor or in a different image captured in the same environment in which the product descriptor occurs. The persons may or may not be the consumer or buyer of a product related to the product descriptor. Information about the persons may include age, gender, size (e.g., weight and height), etc. The context may also include information regarding other objects appearing in the captured images. Other objects may include other products and/or product descriptors appearing in the captured images. For example, a bottle of water appearing in an image may be accompanied by a slice of pizza.

The at least one processing device (e.g., processor 210 or processor 540) may perform various actions based on the context associated with the occurrence of the product descriptor. For example, the at least one processing device may recommend a product to user 100 of wearable apparatus 110, inform user 100 of an ongoing or upcoming sales or promotion event for a product associated with the product descriptor. The processing device may compare the price of the product associated with the product descriptor with the price of similar products, or compare prices of the same product associated with the product descriptor offered for sale at different stores. The context information associated with the occurrence of the product descriptor may be used in various aspects of marketing research and business planning. For example, the context information may be used to determine a targeted population for an advertisement, a time and/or place for holding sales or promotions events, arrangement of store display of certain products together with other related products, and a bundle or package of two different products offered for sale together to promote sales of each product.

Figure 6:
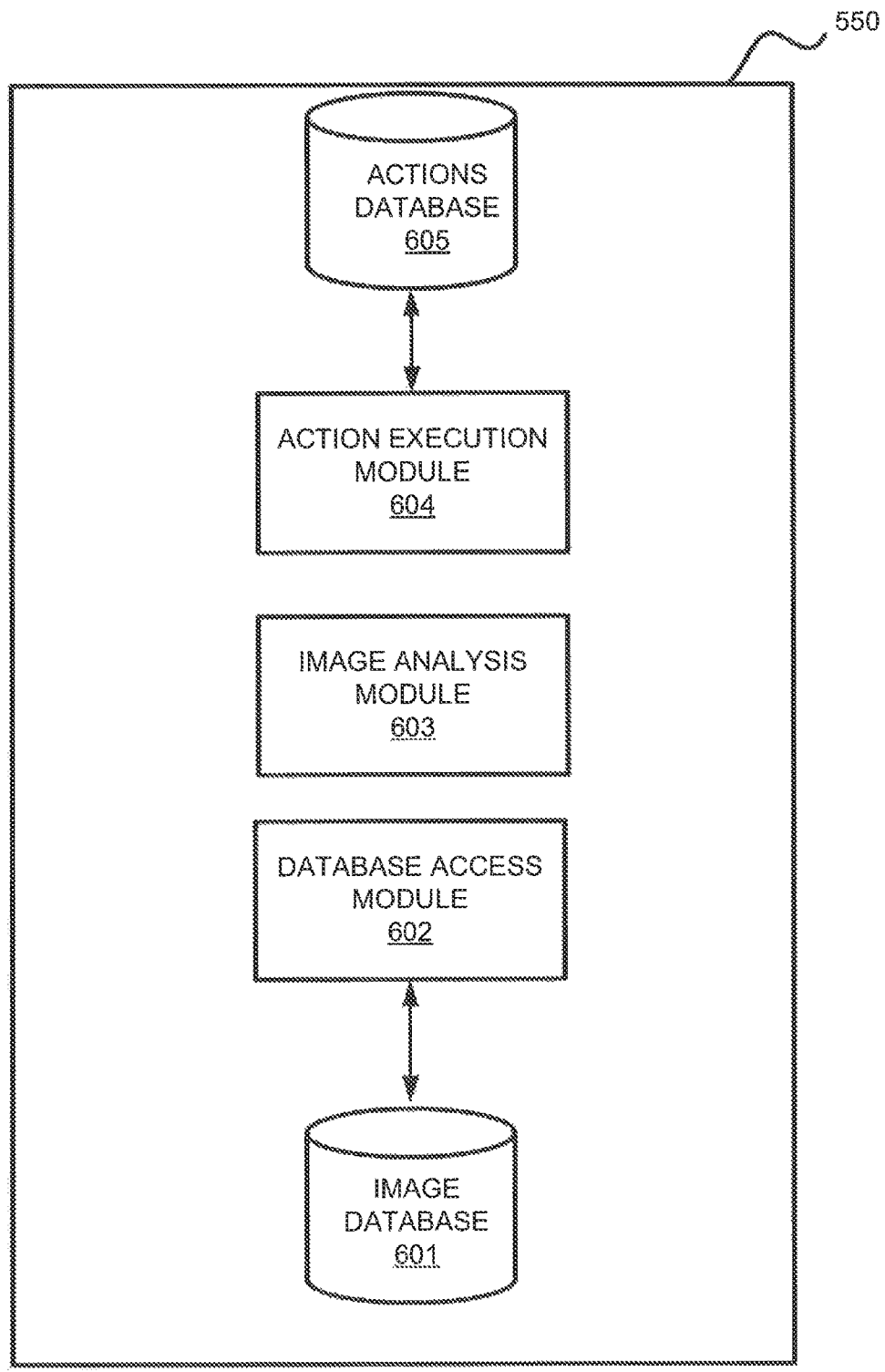
FIG. 6 is a diagram illustrating an example memory storing a plurality of modules.

FIG. 6 is a block diagram illustrating a memory (e.g., memory 550, 550a, and/or 550b) according to the disclosed embodiments. The memory may include one or more modules, or sets of instructions, for performing methods consistent with the disclosed embodiments. For example, the memory may include instructions for a processor to analyze product descriptors in captured image data. In the example shown in FIG. 6, memory 550 comprises an action execution module 604, an image analysis module 603, a database access module 602, an image database 601, and an actions database 605 for performing the functionality of the disclosed methods. The modules and databases shown in FIG. 6 are by example only, and a processor in the disclosed embodiments may operate according to any suitable process.

In the embodiment shown in FIG. 6, memory 550 is configured to store an image database 601. Image database 601 may be configured to store various images, such as images captured by image sensor 220, 220a, and/or 220b. Image database 601 may also be configured to store images that are not captured by image sensor 220, 220a, and/or 220b. For example, previously acquired graphics of products, logos, store images, etc., may be stored in image database 601. Image database 601 may also be configured to store data other than image data, such as textual data, audio data, video data, etc.

As shown in FIG. 6, memory 550 is also configured to store a database access module 602. Database access module 602 may be configured to access image database 601, for example, to retrieve an image captured by image sensor 220, 220a, and/or 220b for analysis. In some embodiments, database access module 602 may be configured to retrieve a pre-stored graphic of a product for comparison with an image captured in real time by image sensor 220, 220a, and/or 220b. Database access module 602 may also be configured to store images into image database 601.

In the embodiment shown in FIG. 6, memory 550 is configured to store an image analysis module 603. Image analysis module 603 may be configured to perform various analyses of images captured by image sensor 220, 220a, and/or 220b to identify an occurrence of a product descriptor. For example, image analysis module 603 may determine information related to the occurrence of the product descriptor. The information related to the occurrence of the product descriptor may include the location, time, environment, other related objects including people and products, shown in the same or related images as the product descriptor. Image analysis module 603 may also determine an identifier of the product descriptor. The identifier may include at least one of a number, an alphabet, a symbol, etc. The identifier may uniquely identify the product descriptor. In some embodiments, each product descriptor may be assigned or associated with a unique identifier. Image analysis module 603 may cause the identifier and the information related to the occurrence of the product descriptor to be saved in memory 550, such as in image database 601.

Referring to the embodiment shown in FIG. 6, memory 550 is configured to store an action execution module 604. Action execution module 604 may execute an action based on analysis results from image analysis module 603. For example, image analysis module 603 may identify a graphic of a product from captured images, compare the identified graphic with graphics stored in image database 601, and determine whether there is a match between the identified graphic and the stored graphics. When a match is found, action execution module 604 may trigger execution of an action, such as providing a visual and/or audio alert regarding a sales or promotion event of a product associated with the identified graphic. The action may also be storing the identified graphic in image database 601, requesting for additional information from server 250, etc. A plurality of predefined actions or feedbacks may be stored in actions database 605. Action execution module 604 may select one or more predefined actions or feedbacks from the actions database 605. The term "action" includes any action executable by wearable apparatus 110, computing device 120, and/or server 250. The term "feedback" includes execution of a computer program by wearable apparatus 110 and/or computing device 120 to provide information to user 100. In some embodiments, actions may be different from feedback. In some embodiments, actions may also include feedback, or feedback may include actions. In some embodiments, the terms "action" and "feedback" may be interchangeable.

Figure 7:
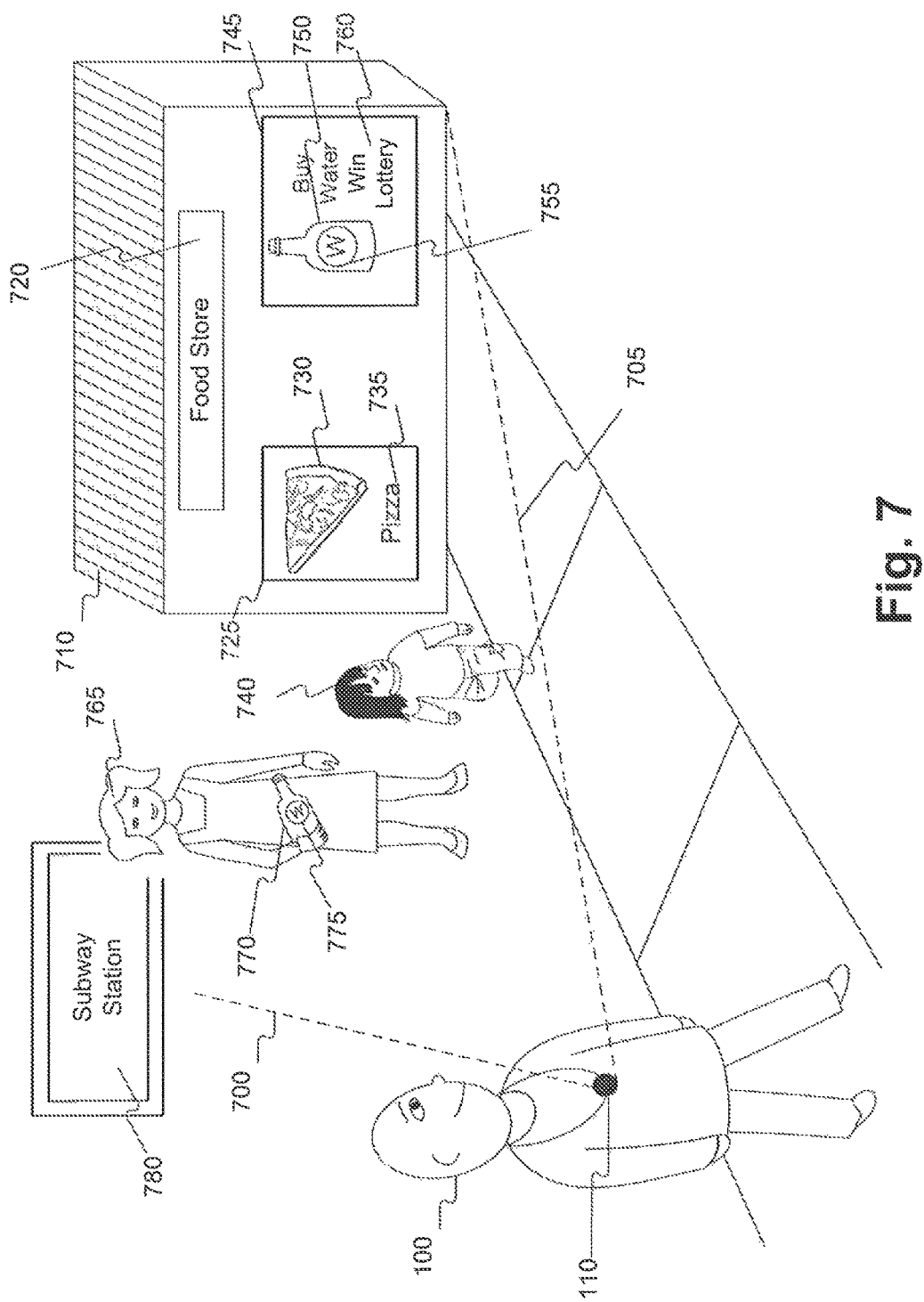
FIG. 7 shows an example environment including a wearable apparatus for capturing and processing images including a product descriptor.

FIG. 7 shows an example environment including wearable apparatus 110 for capturing and processing images including a product descriptor, consistent with the disclosed embodiments. As shown, wearable apparatus 110 may be carried on a necklace worn by user 100. It is understood that wearable apparatus 110 may be worn by user 100 on any suitable part of user 100. For example, wearable apparatus 110 may be attached to a belt or shirt of user 100 using clip 420 shown in FIG. 4B. As another example, wearable apparatus 110 may be attached to an arm band secured to an arm of user 100. As a further example, wearable apparatus 110 may be attached to a helmet, cap, or hat worn by user 100. Wearable apparatus 110 may include image sensor 220, 220a, and/or 220b (as shown in FIGS. 5A and 5B), which has a field of view indicated by dashed lines 700 and 705. Image sensor 220, 220a, and/or 220b may capture one or more images of the scene or environment in front of user 100. In this example, user 100 may be walking or standing on a street facing a building 710. One or more images captured by image sensor 220, 220a, and/or 220b may include building 710. Building 710 may be a food store, and may include a sign 720 with a name of the store, e.g., "Food Store," on the front side of the building 710 (hence building 710 may also be referred to as the food store building 710).

The images captured by image sensor 220, 220*a*, and/or 220*b* may include an advertisement 725 posted at the front side of building 710, such as a front wall or window of building 710. Advertisement 725 may show an image or graphic 730 of a pizza, and may show text 735 ("Pizza") below the graphic 730 of the pizza (hence advertisement 725 may be referred to as the pizza advertisement 725). Building 710 may include another advertisement 745 displayed at the front side, such as the front wall or window of building 710. Advertisement 745 may include a graphic 750 of bottled water (hence advertisement 745 may be referred to as the water advertisement 745). The bottled water may include a logo 755, which includes the text "W" within a circle. Logo 755 may represent a brand for bottled water and logo 755 may also be a trademark. Advertisement 745 may also include texts 760, which states "Buy Water, Win Lottery."

Referring to FIG. 7, one or more images captured by image sensor 220, 220*a*, and/or 220*b* may also include a first person 740 and a second person 765. The first person 740 may be a child, who may be looking at pizza advertisement 725. The second person 765 may be a young woman who has just stepped out of a subway station, as indicated by a subway station sign 780. The young woman may hold bottled water 770 in her hand. As shown in FIG. 7, bottled water 770 may include a logo "W" 775 similar to logo 755 shown in water advertisement 745.

In some embodiments, an image captured by image sensor 220, 220*a*, and/or 220*b* may include all objects within the field of view (as indicated by dashed lines 700 and 705) of the camera included in image sensor 220, 220*a*, and/or 220*b*. In some embodiments, image sensor 220, 220*a*, and/or 220*b* may capture more than one image of the environment in front of user 100 in different field of views. For example, image sensor 220, 220*a*, and/or 220*b* may capture a first image including the front side of building 710 in a first field of view. Image sensor 220, 220*a*, and/or 220*b* may capture a second image focusing on water advertisement 745 in a second field of view, image sensor 220, 220*a*, and/or 220*b* may capture a third image focusing on pizza advertisement 725 in a third field of view. To capture different images in different field of views, user 100 may move his/her body such that wearable apparatus 110 (and hence the camera or cameras included therein) is oriented in different directions.

At least one processing device (e.g., processor 210 and/or processor 540) may be configured or programmed to process one or more captured images. The processing device may analyze the captured images to identify one or more images including an occurrence of a product descriptor. The product descriptor may be a logo (e.g., logo 755) or an advertisement (e.g., advertisements 725 and 745). The processing device may determine information related to the occurrence of the product descriptor based on analysis of the captured images. The information may include a location of the product descriptor. In the example shown in FIG. 7, the location of the product descriptor (e.g., the logo 755) may include information indicating that user 100 who wears wearable apparatus 110 is on a street, outside of a food store, etc. in some embodiments, the location may also include geographical location information, such as a Global Positioning System (GPS) coordinates.

The information related to the occurrence of the product descriptor (e.g., logo 755) may include a context associated with the occurrence of the product descriptor. The processing device may obtain the context associated with the occurrence of the product descriptor from analysis of the captured images. For example, the context related to logo 755 may include information related to the environment in which logo 755 is displayed. For example, the environment may include a restaurant, a food store (e.g., food store 710), a subway station (e.g., a subway station sign 780), a sports field, etc. The context related to logo 755 may also include information relating to other objects, including persons and/or products that are also included in the captured images. For example, the context may include information indicating that logo 755 appears on a water bottle 750, which is displayed at food store 710 along with pizza advertisement 725. The processing device may correlate the display of water advertisement 745 with the display of pizza advertisement 725. The correlation between displaying water advertisement 745 that includes logo 755 and displaying pizza advertisement 725 may reflect a purchasing habit or food preference, such as, people tend to buy water when they buy pizza. The purchasing habit or food preference may also be associated with a particular location (e.g., food store 720).

The processing device (e.g., processor 210 and/or processor 540) may be programmed or configured to determine a date and/or time of the occurrence of the product descriptor. For example, images captured by image sensor 220, 220*a*, and/or 220*b* may be stored in image database 601 together with the date and/or time when the images were captured. In some embodiments, the processing device may determine the time of a day from the image. For example, when the image includes a graphic of a clock, the processing device may determine the time of a day from the clock included in the image. The processing device may determine the time of a day based on the sun and/or the moon that appear in the captured image. In some embodiments, the processing device may determine the time of a day based on a shadow of a building, a tree, a person appearing in the image, when the sun is not included in the image.

The context may include information regarding a person appearing in the same image as a product descriptor. For example, wearable apparatus 110 may capture an image including a product descriptor represented by pizza advertisement 725 and person 740. The processing device may analyze the captured image to determine that person 740 is a child who is looking at pizza advertisement 725. The processing device may determine the age and/or gender of person 740 based on the size, appearance, hair style, cloths, posture, and facial characteristics of person 740. The processing device may analyze other characteristics of person 740 to recognize that person 740 is a child of a certain age or within a range of age. The processing device may determine that person 740 is looking at or has in his or her possession pizza or a particular kind of pizza (e.g., pepperoni pizza) displayed in pizza advertisement 725. The at least one processing device may further determine, based on the captured image and statistical analyses of other previously captured and analyzed images, that children of similar ages as person 740 may tend to like pizza or this particular type of pizza.

As another example, wearable apparatus 110 may capture an image including person 765 who is holding a bottled water 770 that has a product descriptor represented by logo 775 (text "W" within a circle). Logo 775 may be the same as logo 755. The at least one processing device may determine the age and/or gender of person 765 based on the size, appearance, hair style, cloths, shoes, posture, and facial characteristics of person 765. The processing device may analyze other characteristics of person 765 to recognize that person 765 is a young woman of a certain age or within an age range. The at least one processing device may determine, based on the captured image and statistical analyses of other previously captured and analyzed images, that young women of similar ages as person 765 may like drinking bottled water or the particular type or brand of bottled water (e.g., the "W" brand shown in FIG. 7). In some embodiments, the processing device may further determine another characteristic of person 765. For example, based on the dresses, hair style, and/or facial characteristics of person 765, the processing device may determine that person 765 is a student. The processing device may determine, based on the captured image and statistical analyses of other previously captured and analyzed images that, for example, female students of similar ages as person 765 may like bottled water or the particular brand of bottled water.

In some embodiments, the information determined based on the analysis of one or more identified images may include one or more of: a continuous duration in which occurrences of the product descriptor are identified in the plurality of images, a total time in which occurrences of the product descriptor are identified in the plurality of images, a total number of images in which occurrences of the product descriptor are identified, and a frequency of images in which occurrences of the product descriptor are identified.

For example, the processing device may analyze a plurality of images to identify occurrences of a product descriptor (e.g., logo 775), and determine a continuous duration of time in which the occurrences are identified. The occurrences may be identified, e.g., in a continuous duration of two minutes. This information may be used to determine whether the product descriptor is static or is moving. As another example, the processing device may analyze the plurality of images to determine the total time in which the product descriptor appeared in one or more images. The total time may or may not be a continuous time duration. The total time may be a factor evaluated by the processing device to determine whether additional information regarding the product descriptor or the associated product should be requested from, e.g., server 250.

In some embodiments, the processing device may determine, from analysis of the plurality of images, a total number of images in which occurrences of the product descriptor ware identified. For example, when the product descriptor repeatedly occurs in the captured images, the processing device may analyze the product descriptor in more detail, or request a server (e.g., server 250) to provide additional information regarding the product descriptor or the associated product. In some embodiments, the processing device may determine, based on analysis of the plurality of images, a frequency of images in which occurrences of the product descriptor are identified. The frequency of images may be used to determine, for example, how often user 100 encounters a particular product descriptor.

In some embodiments, image sensor 220, 220a, and/or 220b may capture an image of a certain area based on a hand gesture of user 100. For example, user 100 may point a hand to water advertisement 745. Image sensor 220, 220a, and/or 220b may capture an image including the hand of user 100 pointing to water advertisement 745. The at least one processing device may analyze the captured image and detect the hand gesture from the captured image. Based on the hand gesture (which may be an example of a hand-related trigger discussed above), wearable apparatus 110 may provide additional information to user 100. For example, wearable apparatus 110 may provide a video, audio, and/or text message or alert to user 100 regarding a discount, coupon, sales promotion related to bottled water 750, available in food store 720 or another store. As another example, wearable apparatus 110 may provide additional information to user 100 regarding the "Buy Water, Win Lottery" sales event, such as the price of the "W" brand bottled water, the winning rate of the lottery, etc. Wearable apparatus 110 may obtain such additional information from server 250, with which wearable apparatus 110 may be wirelessly connected, as shown in FIG. 2. The additional information may be provided in a video, audio, and/or text message, for example, through feedback outputting unit 230 included in wearable apparatus 110, or through computing device 120, which may also be carried or used by user 100.

Figure 8:
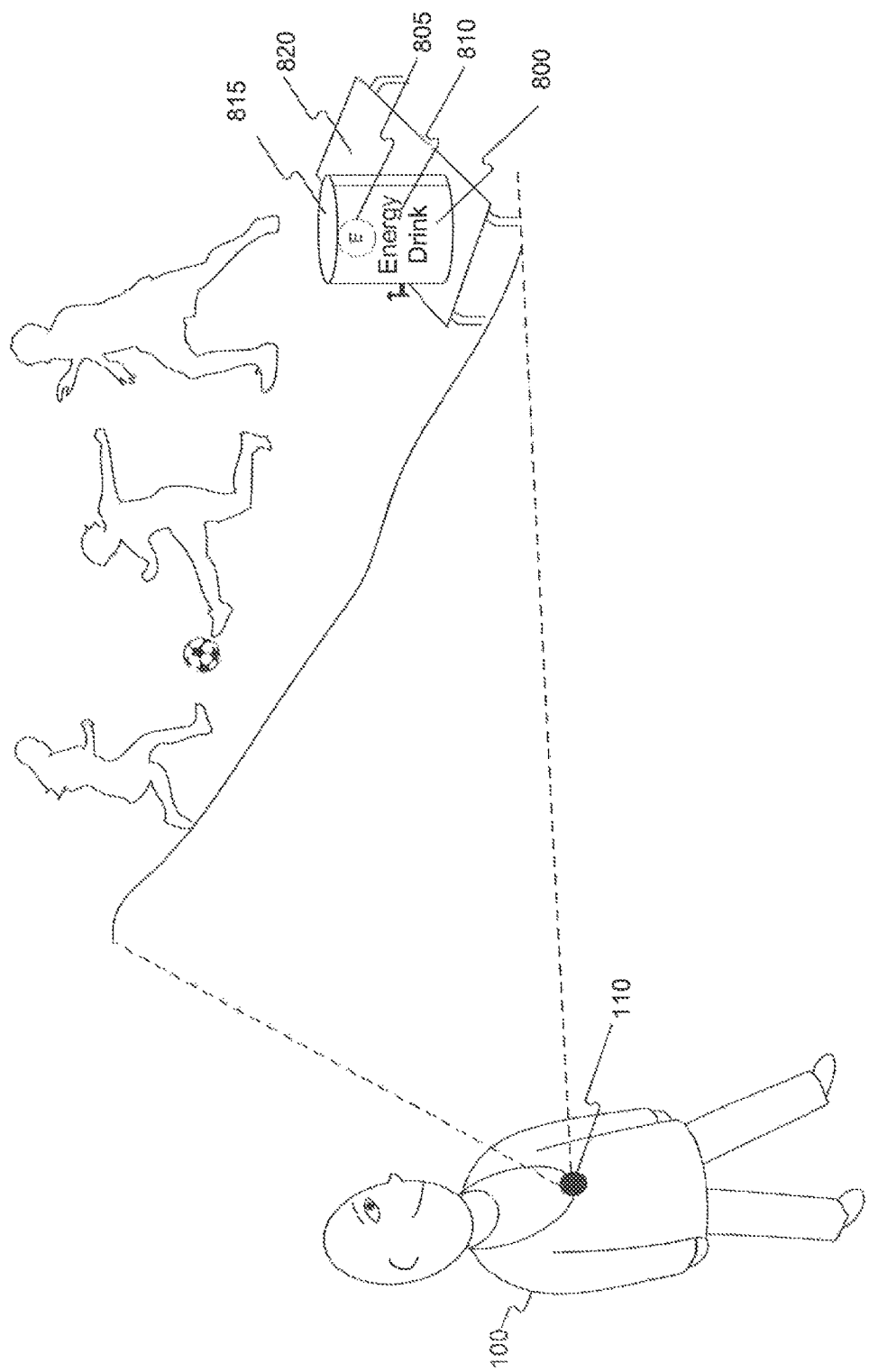
FIG. 8 shows another example environment including a wearable apparatus for capturing and processing images including a product descriptor.

FIG. 8 shows another example environment including wearable apparatus 110 for capturing and processing images including a product descriptor, consistent with the disclosed embodiments. Wearable apparatus 110 may capture, via image sensor 220, 220a, and/or 220b, one or more images including a product descriptor 800. Product descriptor 800 may include a logo 805 and a text description 810. Logo 805 may include a circle surrounding a letter "E." Text description 810 may include text such as "Energy Drink," Logo 805 and text description 810 may be shown on a surface of a barrel 815. Barrel 815 may be located on a table 820. The one or more images may also include a scene showing a soccer field, where a plurality of soccer players are playing a soccer game. The table 820 may be placed on the side of the soccer field. The processing device (e.g., processor 210 and/or processor 540) may analyze the one or more images and correlate the product descriptor 800 with the scene showing the soccer game. The correlation may be used for marketing research to find that sports players, such as soccer players, like this brand of energy drink.

Wearable apparatus 110 may provide additional information about the energy drink to user 100. Wearable apparatus 110 may obtain such additional information from server 250, with which wearable apparatus 110 may be wirelessly connected, as shown in FIG. 2. For example, wearable apparatus 110 may inform user 100 of ongoing sales or promotion events associated with the brand "E" energy drink, through a video, audio, and/or text message. The video, audio, and/or text message may be presented to user 100 through feedback outputting unit 230 included in wearable apparatus 110 or through computing device 120, which may also be carried or used by user 100.

Figure 9:
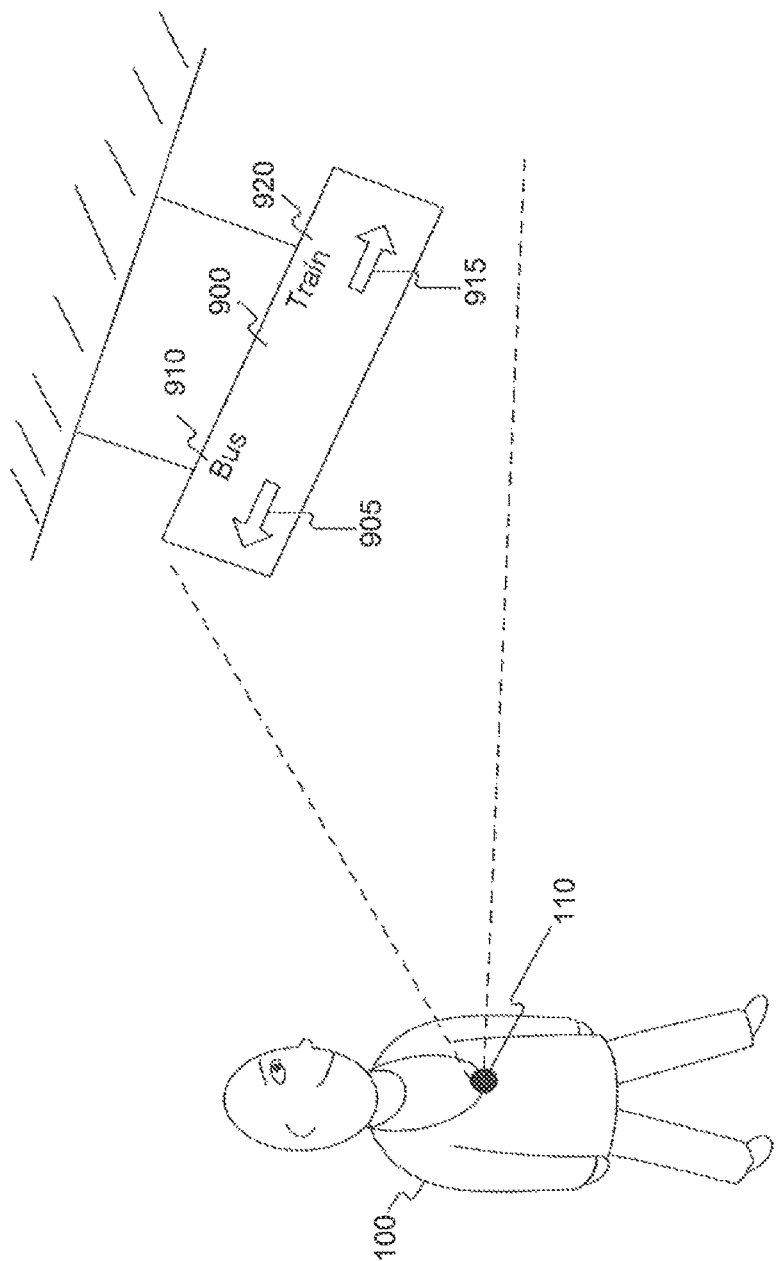
FIG. 9 shows another example environment including a wearable apparatus for capturing and processing images including a product descriptor.

FIG. 9 shows another example environment including wearable apparatus 110 for capturing and processing images including a product descriptor, consistent with the disclosed embodiments. Wearable apparatus 110 may capture, via image sensor 220, 220a, and/or 220b, an image of a product descriptor 900 at an airport, for example. The at least one processing device (e.g., processor 210 and/or processor 540) may identify a graphic from the image. The at least one processing device may also identify from the graphic a first directional symbol 905 and a second directional symbol 915. The at least one processing device may further identify that the graphic includes a text description 910 ("Bus") and a text description 920 ("Train"). Text description 910 may be associated with first directional symbol 905 and text description 920 may be associated with second directional symbol 915. Wearable apparatus 110 may play a video, audio, and/or text message through feedback output unit 230 and/or computing device 120 to direct user 100 to a bus terminal in accordance with first directional symbol 905, or to a train terminal in accordance with second directional symbol 915.

Wearable apparatus 110 may provide additional information to user 100 regarding the directions to the bus terminal and/or the directions to the train terminal. In some embodiments, the additional information may include schedules of buses and/or trains. The schedule information may enable user 100 to plan his or her trip. Wearable apparatus 110 may obtain such additional information from server 250, with which wearable apparatus 110 may be wirelessly connected, as shown in FIG. 2.

Figure 10:
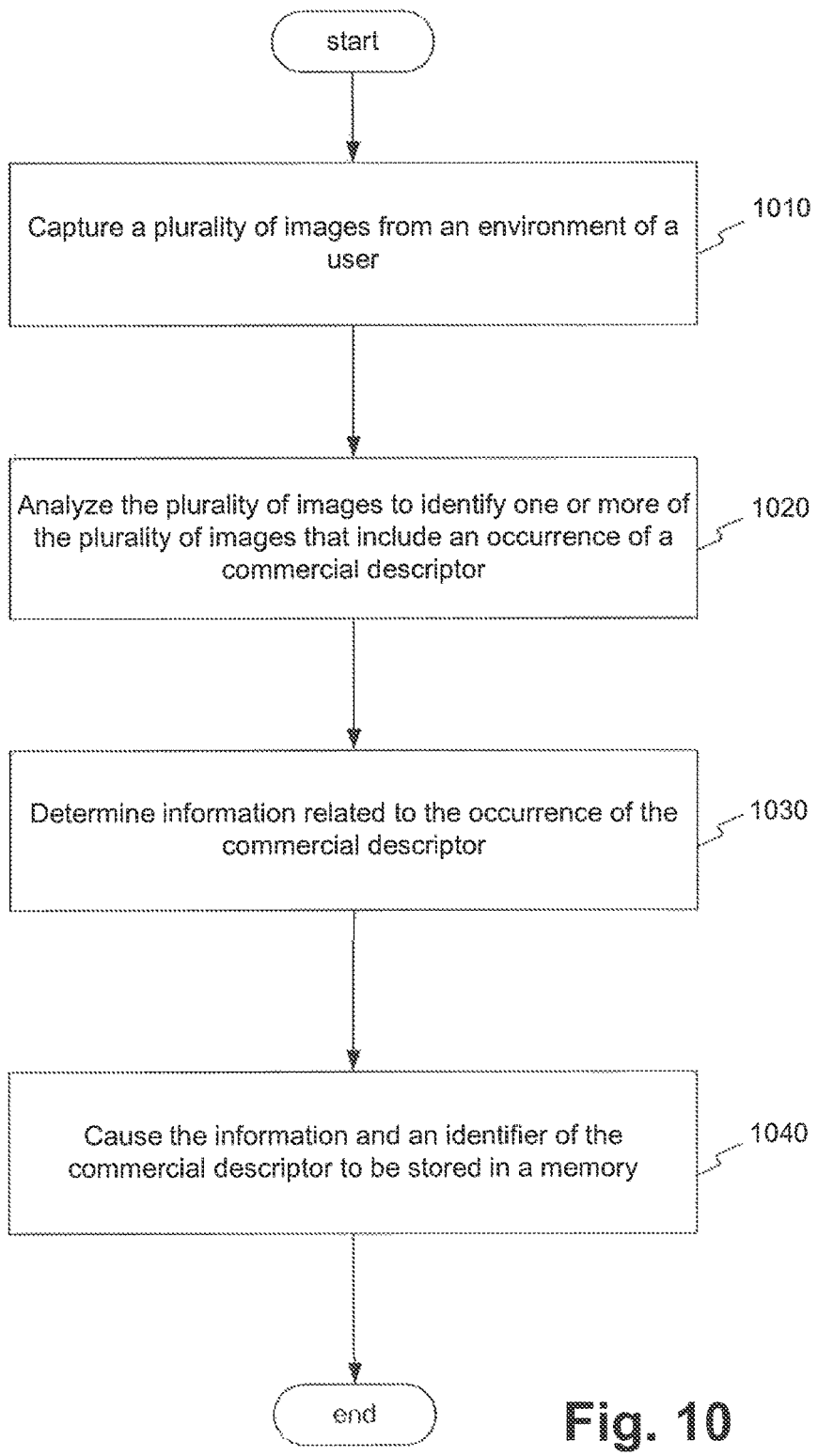
FIG. 10 is a flowchart showing an example method for processing images including a product descriptor.

FIG. 10 is a flowchart showing an example method 1000 fix processing images including a product descriptor, consistent with the disclosed embodiments. Method 1000 may be executed by various devices included in wearable apparatus 110, such as image sensor 220, 220a, and/or 220b and at least one processing device (e.g., processor 210 and/or processor 540). Method 1000 may include capturing a plurality of images from an environment of user 100 of wearable apparatus 110 (step 1010). For example, image sensor 220, 220a, and/or 220b may capture a plurality of images from an environment of user 100 who wears the wearable apparatus 110. In the example shown in FIG. 7, image sensor 220, 220a, and/or 220b may capture one or more images of the street environment in front of user 100, which includes the food store building 710 having advertisements 725 and 745 on the front side, people 740 and 765, and subway station sign 780. In the example shown in FIG. 8, image sensor 220, 220a, and/or 220b may capture one or more images of the soccer field environment in front of user 100, which includes the soccer field players, table 820 on which barrel 815 containing the "E" energy drink is located.

As shown in FIG. 10, method 1000 may also include analyzing the plurality of images to identify one or more of the plurality of images that include an occurrence of a product descriptor (step 1020). For example, referring to FIG. 7, the processing device (e.g., processor 210 and/or processor 540) may analyze a plurality of images of the street environment in front of user 100. The processing device may identify an image that includes an occurrence of a product descriptor. The product descriptor may include a logo (e.g., logo 755), an advertisement (e.g., water advertisement 745), an image of a product (e.g., an graphic 730 of a slice of a pizza), and an image of a store (e.g., food store building 710 having sign 720 that reads "food store"). The product descriptor may include other signs, images, such as "Subway Station" sign 780.

Referring to FIG. 10, method 1000 may include determining, based on the analysis of the one or more identified images, information related to the occurrence of the product descriptor (step 1030). The information determined or extracted by the processing device based on the analysis of the identified images may include one or more of a location of the product descriptor, a context associated with the occurrence of the product descriptor, and a time of day of the occurrence of the product descriptor. In some embodiments, the location of the product descriptor (e.g., pizza advertisement 725) may include information indicating the place the product descriptor occurs, such as at a restaurant, at a food store, outside a subway station, in a street, etc. In some embodiments, the location may also include specific Global Positioning System (GPS) coordinates. The processing device may obtain or determine the location information based on signals or data received from a GPS unit included in wearable apparatus 110, or a GPS unit included in computing device 120, which user 100 may also carry. In some embodiments, the location may include a detailed street address, including zip code, city, state, and/or country. The processing device may obtain or determine the location information based on street signs that show the street number and the street name.

The context associated with the occurrence of the product descriptor may include various types of information associated with objects and/or products appearing in the images along with the product descriptor. For example, for the product descriptor of pizza advertisement 725 shown in FIG. 7, the context may include that pizza advertisement 725 is displayed together with water advertisement 745, and/or person 740 looked at graphic 730 of pizza included in pizza advertisement 725. For the product descriptor 800 of "E" brand energy drink shown in FIG. 8, the context may be the "E" brand energy drink being consumed on a sports (e.g., soccer) field.

The processing device may determine the time of day of the occurrence of the product descriptor based on the brightness of sunshine, the direction of shadows of buildings, trees, and people under the sunshine, as identified in the captured images. For example, in the example Shown in FIG. 8, the processing device may determine from the image of the soccer field that it is around 12:00 p.m. because the length of the shadow of a player is short. As another example, the processing device may determine the time to be morning or afternoon based on the brightness of the sunshine.

Referring to FIG. 10, method 1000 may include causing the information and an identifier of the product descriptor to be stored in a memory, such as memory 550, 550a, 550b (step 1340). For example, the processing device (e.g., processor 210 and/or processor 540) may cause the information and the identifier related to the occurrence of the product descriptor to be stored in image database 601. In some embodiments, the processing device may cause the information and the identifier related to the occurrence of the product descriptor to be stored in server 250, which may include at least one storage device, such as a hard disk, a memory, and/or a tape configured to store data and information.

FIG. 11 shows an example database table 1100 for storing the information and the identifier related to the occurrence of the product descriptor, consistent with the disclosed embodiments. Database table 1100 may be stored in memory 550 (e.g., image database 601), memory 550a, memory 550b, and storage devices included in server 250. Database table 1100 may include a plurality of rows and columns. The header row showing "Identifier," "Product Descriptor," "Location," "Context," and "Date & Time," may or may not be part of the actual database table 1100. FIG. 11 shows 50 example rows for storing information and data under the categories of "Identifier," "Product Descriptor," "Location," "Context," and "Date & Time." Three example rows are referenced as 1101, 1102, and 1150. Each row from 1101 to 1150 may store information and an identifier related to an occurrence of a product descriptor. For each row of data corresponding to each product descriptor, each column of database table 1110 may store different information or data. FIG. 11 shows five columns 1161-1165. Column 1161 may store an "Identifier" for a product descriptor. Column 1162 may store a description of the product descriptor. Column 1163 may store "Location" information related to the occurrence of the product descriptor. Column 1164 may store "Context" information related to the occurrence of the product descriptor. Column 1165 may store "Date & Time" information related to the occurrence of the product descriptor.

As shown in column 1161, each product descriptor may be associated with a unique identifier stored in database table 1100. The identifier may include a number uniquely assigned to the product descriptor in database table 1100. In some embodiments, the identifier may also include an alphabet (e.g., "ABC," "BCD," etc). In some embodiments, the identifier may include a symbol (e.g., "#," "$," etc.). In some embodiment, the identifier may include any combination of a number, an alphabet, and a symbol. The processing device (e.g., processor 210 and/or processor 540) may read or retrieve data related to the occurrence of a product descriptor from database table 1100 by pointing or referring to an identifier.

Three example database rows are shown in FIG. 11 for three product descriptors. The first product descriptor is the pizza advertisement 725 shown in FIG. 7, which may be associated with an identifier "1001." The location related to the occurrence of the pizza advertisement 725 may be "15 K. Street, Washington, D.C." The context associated with the occurrence of the pizza advertisement 725 may be "child looking at pizza advertisement posted in the window of food store," The date and time associated with the occurrence of the pizza advertisement 725 may be "Jun. 7, 2015, 3:00 p.m."

Referring to the example database table 1100 shown in FIG. 11, the second product descriptor is the logo 775 of "W" bottled water shown in FIG. 7, which may be associated with an identifier of "1002." The location associated with the occurrence of the logo 775 of "W" bottled water may be "15 K Street, Washington, D.C." The context associated with the occurrence of the logo 775 of "W" bottled water may be "Young woman holding bottled water (brand "W") outside subway station." The date and time associated with the occurrence of the logo 775 may be "Jun. 7, 2015, 3:00 p.m."

Referring to the example database table 1100 shown in FIG. 11, the third product descriptor shown in database table 1100 is the "E Energy Drink" (e.g., logo 805 and text description 810), as shown in FIG. 8. The third product descriptor may be associated with an identifier "1050," which indicates that the E Energy Drink product descriptor may be the fifth entry in database table 1100. The location associated with the occurrence of the E Energy Drink product descriptor may be a GPS location of "GPS 38.9047° N, 77.0164° W," The context associated with the occurrence of the E Energy Drink may be "E Energy Drink placed on table in soccer field," as shown in FIG. 8. The date and time associated with the occurrence of the E Energy Drink product descriptor may be "Jun. 15, 2015, 1:00 p.m."

FIG. 12 is a flowchart illustrating an example method 1200 for processing images including a product descriptor, consistent with the disclosed embodiments. Method 1200 may be performed by various devices included in wearable apparatus 110, such as, image sensor 220, 220a, and/or 220b and a processing device (e.g., processor 210 and/or processor 540). Steps included in method 1200 may be performed in combination with or in place of steps included in method 1000. For example, some steps included in method 1210 may be included in method 1000 as additional steps or as alternatives for replacing some steps included in method 1000. Some steps included in method 1000 may be included in method 1200 as additional steps or as alternatives for replacing some steps included in method 1200.

Method 1200 may include capturing a plurality of images from an environment of user 100 of wearable apparatus 110 (step 1210). For example, image sensor 220, 220a, and/or 220b may capture one or more images of an environment in front of user 100, including the food store building 710, the persons 740 and 765, and the subway station sign 780 as shown in FIG. 7, or an environment including the soccer game field as shown in FIG. 8. Method 1200 may include analyzing the plurality of images to identify one or more of the plurality of images that include an occurrence of a product descriptor (step 1220). The analysis may be similar to that discussed above in connection with step 1020 of method 1000. Method 1200 may also include identifying, in one or more of the identified images, a graphic (step 1230). For example, the processing device may identify an image of water advertisement 745 shown in FIG. 7 from a plurality of images of the environment captured by wearable apparatus 110. From the image of water advertisement 745, the processing device may further identify a graphic. The graphic may be a graphic of logo 755.

Method 1200 may also include comparing the identified graphic with a plurality of stored representations of known graphics (step 1240). For example, a plurality of known graphics of different brands of bottled water may be stored in memory 550 (e.g., in image database 601). The processing device may access image database 601 to retrieve the plurality of known graphics of different brands of bottled water. The processing device may compare the graphic of logo 755 with the stored representations of known graphics to find a match.

Method 1200 may further include selecting feedback to be provided to user 100 based on finding a match between the identified graphic and a representation of a known graphic (step 1250). For example, one or more known graphics of the "W" brand bottled water may be previously stored in image database 601. The processing device may match the graphic of logo 755 with one or more of the stored representation of the known graphics of the "W" brand bottled water. The processing device may select one or more feedbacks from action database 605 that stores a plurality of predefined actions or feedbacks to be provided to user 100. For example, the at least one processing device may select a feedback of providing to user 100 a sales promotion of the "W" brand bottled water. The processing device may cause the feedback to be provided to user 100 in a video, audio, and/or text message, in some embodiments, the feedback may include at least one of an audible feedback and a visual feedback. In some embodiments, the at least one processing device may cause feedback outputting unit 230 included in wearable apparatus 110 or computing device 120 to present the selected feedback to user 100. In some embodiments, the feedback may be providing prices of competitors of "NV" brand bottled water, product recalls of "W" brand, etc.

Figure 13:
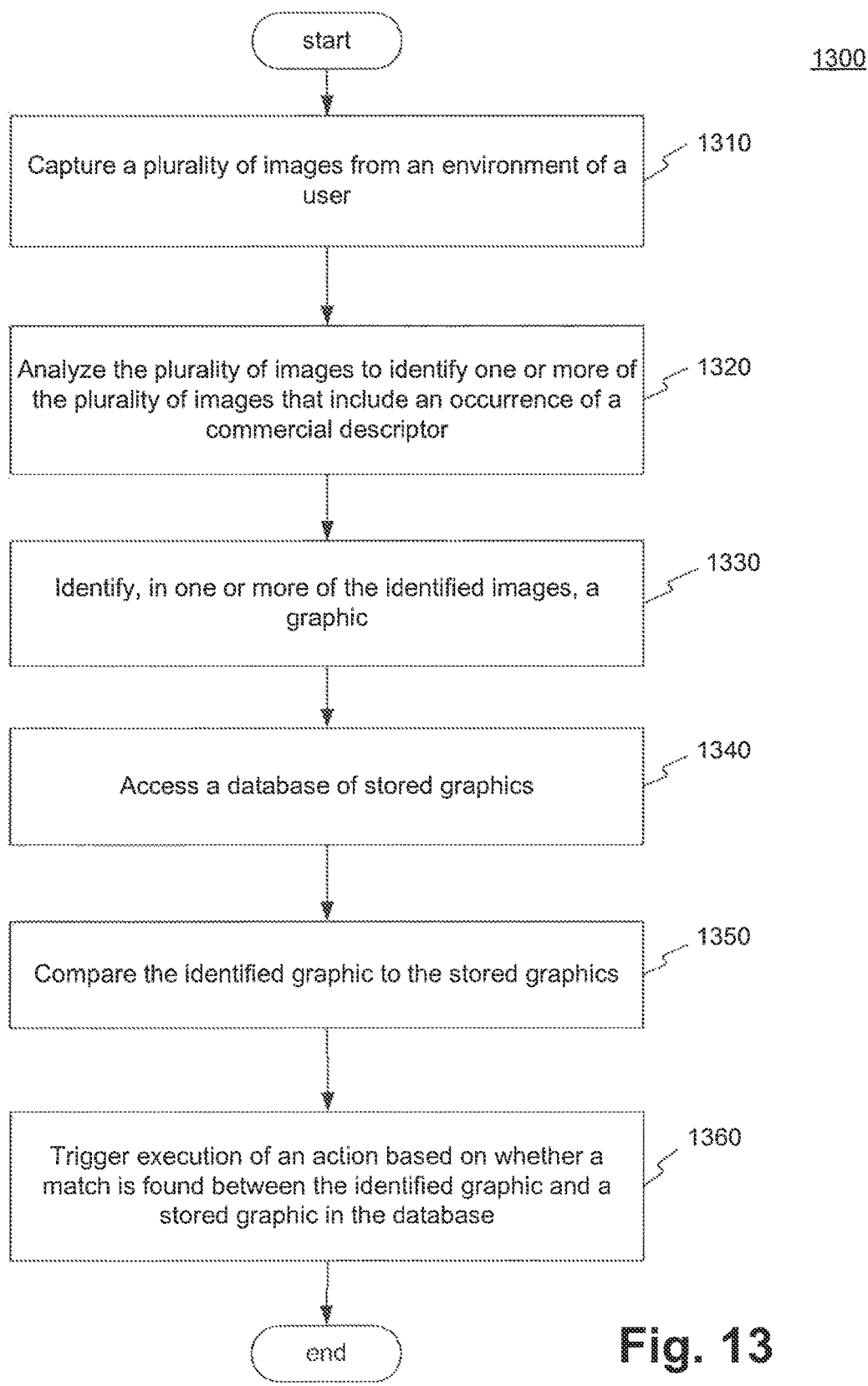
FIG. 13 is a flowchart illustrating another example method for processing images including a product descriptor.

FIG. 13 is a flowchart illustrating another example method 1300 for processing images including a product descriptor, consistent with the disclosed embodiments. Method 1300 may be performed by various devices included in wearable apparatus 110, such as, image sensor 220, 220a, and/or 220b and a processing device (e.g., processor 210 and/or processor 540). Steps included in method 1300 may be performed in combination with or in place of steps included in method 1000 and/or method 1200. For example, some steps included in method 1000 and/or 1200 may be included in method 1300 as additional steps or as alternatives for replacing some steps included in method 1300. Some steps included in method 1300 may be included in method 1000 and/or method 1200 as additional steps or as alternatives for replacing some steps included in method 1000 and/or method 1200. Methods 1000, 1200, and 1300 are not mutually exclusive.

As shown in FIG. 13, method 1300 may include capturing a plurality of images from an environment of user 100 of wearable apparatus 110 (step 1310). Steps 1310 may be similarly performed as steps 1010 and 1210. Method 1300 may also include analyzing the plurality of images to identify one or more of the plurality of images that include an occurrence of a product descriptor (step 1320). Step 1320 may be similarly performed as steps 1020 and 1220. Method

1300 may include identifying, in one or more of the identified images, a graphic (step 1330). Step 1330 may be similarly performed as steps 1030 and 1230. The identified graphic may include at least one of a printed image (e.g., a printed image 750 of the "W" brand bottled water, as shown in FIG. 7) and a text (e.g., texts 760 of "Buy Water, Win Lottery" as shown in FIG. 7). The identified graphic may include a logo associated with a brand of a product (e.g., logo 755 of the "W" brand of bottled water).

Referring to FIG. 13, method 1300 may also include accessing a database of stored graphics (step 1340). For example, the at least one processing device may access image database 601, which may store a plurality of graphics. Method 1300 may also include comparing the identified graphic to the stored graphics (step 1350). Step 1350 may be similarly performed as step 1240.

Method 1300 may further include triggering execution of an action based on whether a match is found between the identified graphic and a stored graphic in the database (step 1360). For example, when a match between logo 755 of the "W" brand bottled water and stored logos of "W" brand bottled water is found, the at least one processing device may cause information related to the identified graphic (e.g., logo 755) to be stored in a database, such as image database 601. For example, the processing device may cause the location information at which the graphic was identified, the time of day when the graphic was identified, etc., to be stored in image database 601. In some embodiments, the processing device may cause a communications interface of wearable apparatus 110, such as data port 570 (shown in FIG. 5A), wireless transceivers 530 (shown in FIG. 5A) and 530*a* (shown in FIG. 5C) to transmit information indicating that the graphic (e.g., logo 755) was identified to computing device 120 and/or server 250 when the action is executed. In some embodiments, the action may include requesting computing device 120 and/or server 250 to provide additional information regarding the identified graphic (e.g., logo 755 of "NV" brand bottled water). For example, the processing device may request server 250 to search the Internet or databases for stock prices of the "W" brand, prices and/or discounts offered by competitors of the "W" brand, product recalls of the "W" brand, etc. The action may further include receiving, by the processing device through the communications interface, the requested information from the server 250, and presenting the requested information to user 100.

In some embodiments, the action may include identifying objects near the identified graphic. For example, in the example shown in FIG. 8, wearable apparatus 110 may capture a plurality of images of the soccer field. The processing device may analyze the images to identify an image including product descriptor 800 that includes logo 805 (letter "E" within a circle) and text description 810 ("Energy Drink"). The processing device may identify a graphic containing logo 805. The processing device may access image database 601 to retrieve stored graphics, and compare the identified graphic including logo 805 with the stored graphics. When a match is found between the identified graphic including logo 805 and one or more of the stored graphics related to "E" brand energy drinks, the processing device may trigger an action to analyze the captured images to identify objects near the identified graphic including logo 805. For example, the at least one processing device may identify barrel 815, table 820, and soccer players on the soccer field. The identified objects near the identified graphic including logo 805 may provide context information regarding the occurrence of the logo 805.

In some embodiments, the graphic as identified in step 1330 may include a directional symbol, such as first directional symbol 905 and second directional symbol 915 shown in FIG. 9. The action triggered by identifying the graphic may include providing a feedback to user 100 that includes directing user 100 in accordance with the directional symbol. For example, the at least one processing device may cause a video, audio, and/or text message to be presented to user 100 through feedback outputting unit 230 and/or computing device 120 to direct user 100 to turn left for the bus terminal in accordance with first directional symbol 905.

In some embodiments, the action triggered by identifying the graphic may include providing a feedback including presenting to user 100 stored information associated with the identified graphic. For example, the feedback may include the price of the "W" brand bottled water, the prices and/or discounts offered by the competitors of the "W" brand, the product recall information, etc.

Method 1300 may further include additional steps not shown in FIG. 13. For example, method 1300 may include determining, based on the one or more identified images, information related to the occurrence of the product descriptor, as similarly discussed above in connection with step 1030 of method 1000. Method 1300 may also include causing the information and an identifier of the product descriptor to be stored in a memory, as similarly discussed above in connection with step 1040 of method 1000.

In some embodiments, the image data captured by apparatus 110 may be analyzed and processed to identify Objects of interest for user 100. The image data may be analyzed and processed by any processing device, for example, processor 540*a*, processor 540*b*, or a processor associated with server 250. One way to determine that an object of interest is to identify that user 100 has had repetitive exposures to that object. Apparatus 110 may determine whether an object of interest to user 100 by measuring how long user 100 looks at a specific object. For example, if user 100 looks at an object for a predetermined time period (e.g., 5 seconds or more, 10, seconds or more 30 seconds or more, etc.), the object may be classified as an object of interest.

In some embodiments, user 100 may receive feedback associated with the identified object of interest. For example, if a user looks at a Ferrari for a predetermined time period, the user may receive ads for Ferrari. Therefore, apparatus 110 can provide advertising triggers based on exposure to a particular image and that reflect the user's interest level for that image. Once the predetermined time period meets or exceeds a certain threshold, the processing device may trigger advertising that is related to or based on the image that the user has looked at. Accordingly, the processing device may determine, based on analysis of the plurality of images and a predetermined viewing threshold, that user 100 is interested in an object in his/her environment. If the analysis indicates that the predetermined viewing threshold has been met, the processing device may cause performance of an action.

In some cases, the predetermined viewing threshold may be a predetermined amount of time, and the action is performed after the analysis indicates that the object has remained relatively stationary in the plurality of images for more than the predetermined amount of time. Alternatively, the action may be performed after the analysis indicates that the object has remained in a field of view of the user for more than the predetermined amount of time. In other cases, the predetermined viewing threshold includes a predetermined number of image frames, and the action may be performed after the analysis indicates that the object has remained in a central portion of the plurality of images for more than the predetermined number of image frames.

The action may include providing feedback associated with the identified object. For example, the feedback may include at least one of the following: audibly identifying the object, audibly reading text associated with the object, and audibly providing information about the object (e.g., price, ads, warnings, etc.). In addition, the action may include storing information associated with and/or related to the identified object in a memory. For example, the information may include information about an identity of the object, information about a location of identify of the object, information about a time of identifying the object, and/or at least one image of the object.

In one embodiment, a wearable apparatus for processing images comprises a wearable image sensor configured to capture a plurality of images from an environment of the user and at least one processing device. The at least one processing device is configured to determine, based on analysis of the plurality of images and a predetermined viewing threshold, that the user is viewing an object in the environment and cause performance of a predefined action after the analysis of the plurality of images indicates that the predetermined viewing threshold has been met.

In some embodiments, the image data captured by apparatus 110 may be analyzed and processed to discern information about user's environment and to send advertising information to the user based on the image analysis. The processing device may identify an exposure of user 100 to an object (e.g., a product) by analyzing image data captured apparatus 110, and thereafter the processing device may determine if the object is of interest to a third party. If the processing device determines that the identified object is of interest to the third party, the processing device may push a multimedia content file to user 100 related to the identified object.

For example, the third party may be an advertiser and the multimedia content file being pushed to user 100 may be an ad associated with the identified object. In some cases, the multimedia content file may be pushed in real-time to the user's smartphone via an application. Alternatively, the multimedia content file may be pushed after identifying a repeated exposure to an object. The multimedia content file may be associated with a product competing with the object. Also, the multimedia content file may be associated with an identified trait in common with at least two objects held by the user.

In some embodiments, the image data captured by apparatus 110 may be analyzed and processed to trigger an immediate action (e.g., advertising) while the user remains in the situation where the action might have the most impact. The image data may be processed in real-time using any processing device in the environment of user 100, for example, processor 540a, or processor 540b. The processing device may identify a predefined visual trigger in image data and provide a multimedia content file in real-time related to the predefined visual trigger. The predefined visual trigger may be a location (e.g., a CVS store), an object (e.g., beverage vending machine), or an activity (e.g., entering a shopping mall).

In some cases, the visual trigger may be defined by user 100, who can also define that the multimedia content file is to be provided in real-time. For example, assuming user 100 starts a diet (or has some food allergy); the user can define different types of food as visual triggers. In this example, when apparatus 110 identifies that user 100 is about to eat the predefined food, the processing device may provide in real-time a reminder to the user that this food should be avoided. In other cases, the visual trigger may be defined by a third party, which can also define the multimedia content file to be provided to him in real-time. For example, the predefined visual trigger may be a beverage vending machine, and when user 100 goes to any beverage vending machine the processing device may provide in real-time an ad to user 100 via an associated device (e.g., a smartphone).

In some embodiments, the predefined visual trigger may be offered to various companies and the ads belonging to the highest bidder may be provided to user 100. Similar to the way ad-words are being sold based on key words in Internet searches, ad-images may be sold based on real-life exposure of the user to predefined visual triggers. Advertisers will have the ability to bid on visual triggers recognizable by apparatus 110, and have the ads pushed to specific users that are exposed to the predefined visual trigger. In some cases, the bidding process may be used to select an ad after identifying a visual condition in the image data collected by apparatus 110. For example, the advertisers will have the option to provide an ad for milk when the processing device identifies a visual trigger that indicates that the user entered a grocery shop, and after previously identifying a visual condition that indicates that the user does not have milk in his or her refrigerator.

The processing device may also provide to the bidders user demographic information (e.g., the user's age group, gender, etc). To preserve user privacy, the processing device may not provide user-identifiable data. For example, different companies may bid on an image of a vending machine and an ad related to certain products that are available from the vending machine may be provided to a use after identifying that the user is near the vending machine. The bidders may select different ads for different user demographic groups. In the example above, the bidders may bid on a visual trigger of a vending machine for females between ages 21-26, and/or bid on a visual trigger of the same vending machine, but for males between ages 30-35.

In addition, advertisers might bid on traits or combinations of traits derived from image data captured by apparatus 110. Similar to the discussion above regarding ad-images, a predefined trait may be offered to various companies and the ads belonging to the highest bidder may be provided to users who share the trait. For example, the processing device may collect information from a plurality of users, identify from the captured image data traits or behaviors across each user's images, and provide advertisers with the ability to bid on specific traits or behaviors. In one example, the traits may include hobbies, favorite foods, etc.

In some cases, the traits may be derived from repetitive exposure to certain objects in a user's environment. For example, the fact that a user is exposed to hamburgers every other day, may indicate that the user likes to eat hamburgers or that he works at McDonalds. Additionally or alternatively, the traits may be derived from exposure to a combination of objects in a user's environment. For example, the fact that a user is exposed to running shoes, a pedometer, and sport clothing, may indicate that the user likes to jog. Additionally or alternatively, the traits may be derived from engagement in a particular activity or from a plurality of predefined factors. For example, the fact that a user goes to a comic book store, may indicate that the user likes superhero stories.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable apparatus for processing images including a product descriptor, the wearable apparatus comprising:
a wearable image sensor configured to capture a plurality of images from an environment of a user of the wearable apparatus; and
at least one processor programmed to:
analyze the plurality of images to identify one or more of the plurality of images that include an occurrence of the product descriptor;
determine statistical information associated with the product descriptor including a purchase history or a preference related to the product;
based on analysis of the one or more identified images, determine contextual information associated with the product descriptor, wherein the contextual information includes information about a person in the environment of the product descriptor; and
transmit the contextual information and an identifier of the product descriptor to a server.

2. The wearable apparatus of claim 1, wherein the product descriptor includes one or more of: a logo, an advertisement, an image of the product, and an image of a store.

3. The wearable apparatus of claim 1, wherein the at least one processor is further programmed to:
identify, in one or more of the identified images, a graphic; and
compare the identified graphic with a plurality of stored representations of known graphics; and
select feedback to be provided to the server based on finding a match between the identified graphic and a representation of a known graphic.

4. The wearable apparatus of claim 3, wherein the feedback includes at least one of audible feedback and visual feedback.

5. The wearable apparatus of claim 1, wherein the at least one processor is further programmed to:
identify, in one or more of the identified images, a graphic;
access a database of stored graphics;
compare the identified graphic to the stored graphics; and
trigger execution of an action based on whether a match is found between the identified graphic and a stored graphic in the database.

6. The wearable apparatus of claim 5, wherein the identified graphic includes at least one of a printed image and text.

7. The wearable apparatus of claim 5, wherein the identified graphic includes a logo associated with a brand of the product.

8. The wearable apparatus of claim 5, wherein the action includes storing information including at least one of a location and time at which the graphic was identified.

9. The wearable apparatus of claim 5, further comprising a communications interface, wherein the communications interface is configured to transmit information indicating that the graphic was identified to the server when the action is executed.

10. The wearable apparatus of claim 5, wherein the action includes identifying objects near the identified graphic.

11. The wearable apparatus of claim 5, wherein the identified graphic includes a directional symbol and the action includes providing feedback to the user that includes directing the user in accordance with the directional symbol.

12. The wearable apparatus of claim 5, wherein the action includes providing feedback to the server, and the feedback includes stored information associated with the identified graphic.

13. The wearable apparatus of claim 1, wherein the statistical information includes one or more of: a continuous duration in which occurrences of the product descriptor are identified in the plurality of images, a total time in which occurrences of the product descriptor are identified in the plurality of images, a total number of images in which occurrences of the product descriptor are identified, and a frequency of images in which occurrences of the product descriptor are identified.

14. The wearable apparatus of claim 1, wherein the contextual information about the person in the environment of the product descriptor includes an age, a gender, a size, a weight, or a height of the person.

15. The wearable apparatus of claim 14, wherein the contextual information about the person includes at least one of an age or a gender of the person, and the age or the gender are determined based on a posture of the person.

16. The wearable apparatus of claim 1, wherein the contextual information further includes a location associated with the product descriptor.

17. The wearable apparatus of claim 1, wherein the contextual information further includes a time or a date when at least one image including the product descriptor was captured.

18. A wearable apparatus for processing images including a product descriptor, the wearable apparatus comprising:

a wearable image sensor configured to capture a plurality of images from an environment of a user of the wearable apparatus; and at least one processor programmed to:
analyze the plurality of images to identify one or more of the plurality of images that include an occurrence of the product descriptor;
identify, in one or more of the identified images, one or more graphics included in the product descriptor;
access a database of stored graphics;
compare the identified one or more graphics associated with the product descriptor, wherein the contextual information includes information about a person in the environment of the product descriptor; and
transmit the contextual information and an identifier of the product descriptor to a server.

19. The wearable apparatus of claim 18, wherein the identified one or more graphics include at least one of a printed image and text.

20. The wearable apparatus of claim 18, wherein the identified one or more graphics include a logo associated with a brand of the product.

21. The wearable apparatus of claim 18, wherein the at least one processor is further programmed to store information including at least one of a location and time at which the one or more graphics were identified.

22. The wearable apparatus of claim 18, further comprising a communications interface, wherein the communications interface is configured to transmit information indicating that the one or more graphics were identified to the server.

23. The wearable apparatus of claim 18, wherein the at least one processor is further programmed to identify objects near the one or more identified graphics.

24. The wearable apparatus of claim 18, wherein the one or more identified graphics include a directional symbol and the at least one processor is also programmed to provide feedback to the server that includes directing a user in accordance with the directional symbol.

25. The wearable apparatus of claim 18, wherein the at least one processor is also programmed to provide feedback to the server, and the feedback includes presenting to a user stored information associated with the one or more identified graphics.

26. The wearable apparatus of claim 18, wherein the contextual information about the person in the environment of the product descriptor includes an age, a gender, a size, a weight, or a height of the person.

27. The wearable apparatus of claim 26, wherein the contextual information about the person includes at least one of an age or a gender of the person, and the age or the gender are determined based on a posture of the person.

28. The wearable apparatus of claim 18, wherein the contextual information further includes a location associated with the product descriptor.

29. The wearable apparatus of claim 18, wherein the contextual information further includes a time or a date when at least one image including the product descriptor was captured.

30. A method for processing images including a product descriptor, the method comprising:
capturing, via a wearable image sensor, a plurality of images from an environment of a user of a wearable device including the wearable image sensor;
analyzing the plurality of images to identify one or more of the plurality of images that include an occurrence of the product descriptor;
determining statistical information associated with the product descriptor including a purchase history or a preference related to the product;
based on the one or more identified images, determining contextual information associated with the product descriptor, wherein the contextual information includes information about a person in the environment of the product descriptor; and
transmitting the contextual information and an identifier of the product descriptor to a server.

31. A software product stored on a non-transitory computer readable medium and comprising data and computer implemented instructions for carrying out the method of claim 30.

32. The method of claim 30, wherein the contextual information about the person in the environment of the product descriptor includes an age, a gender, a size, a weight, or a height of the person.

33. The method of claim 32, wherein the contextual information about the person includes at least one of an age or a gender of the person, and the age or the gender are determined based on a posture of the person.

34. The method of claim 30, wherein the contextual information further includes a location associated with the product descriptor.

35. The method of claim 30, wherein the contextual information further includes a time or a date when at least one image including the product descriptor was captured.

36. A method for processing images including a product descriptor, the method comprising:
capturing, via a wearable image sensor, a plurality of images from an environment of a user of a wearable device including the wearable image sensor;
analyzing the plurality of images to identify one or more of the plurality of images that include an occurrence of the product descriptor;
identifying, in one or more of the identified images, one or more graphics included in the product descriptor;
accessing a database of stored graphics;
comparing the identified one or more graphics to the stored graphics to determine contextual information associated with the product descriptor, wherein the contextual information includes information about a person in the environment of the product descriptor; and
transmitting the contextual-information and an identifier of the product descriptor to a server.

37. A non-transitory computer readable medium storing computer implemented instructions for carrying out the method of claim 36.

38. The method of claim 36, wherein the contextual information about the person in the environment of the product descriptor includes an age, a gender, a size, a weight, or a height of the person.

39. The method of claim 38, wherein the contextual information about the person includes at least one of an age or a gender of the person, and the age or the gender are determined based on a posture of the person.

40. The method of claim 36, wherein the contextual information further includes a location associated with the product descriptor.

41. The method of claim 36, wherein the contextual information further includes a time or a date when at least one image including the product descriptor was captured.

* * * * *